United States Patent
Hirooka et al.

(10) Patent No.: US 9,445,067 B2
(45) Date of Patent: Sep. 13, 2016

(54) IMAGING DEVICE AND IMAGE SIGNAL PROCESSOR WITH COLOR NOISE CORRECTION

(71) Applicant: Hitachi, Ltd., Chiyoda-ku, Tokyo (JP)

(72) Inventors: Shinichiro Hirooka, Tokyo (JP); Manabu Katsuki, Tokyo (JP); Junji Shiokawa, Tokyo (JP); Yuichi Nonaka, Tokyo (JP)

(73) Assignee: Hitachi Industry & Control Solutions, Ltd., Tokyo (JP)

( * ) Notice: Subject to any disclaimer, the term of this patent is extended or adjusted under 35 U.S.C. 154(b) by 73 days.

(21) Appl. No.: 14/176,038

(22) Filed: Feb. 7, 2014

(65) Prior Publication Data

US 2014/0240533 A1    Aug. 28, 2014

(30) Foreign Application Priority Data

Feb. 28, 2013    (JP) .................................. 2013-038134

(51) Int. Cl.
*H04N 9/64*    (2006.01)

(52) U.S. Cl.
CPC .............. *H04N 9/646* (2013.01); *H04N 9/643* (2013.01)

(58) Field of Classification Search
CPC ...... H04N 9/646; H04N 9/643; H04N 9/735; H04N 9/04
USPC ............................. 348/222.1, 223.1, 234, 241
See application file for complete search history.

(56) References Cited

U.S. PATENT DOCUMENTS

| | | | |
|---|---|---|---|
| 7,382,928 B2 | 6/2008 | Wong et al. | |
| 2004/0085459 A1* | 5/2004 | Hoshuyama | H04N 9/735 348/223.1 |
| 2010/0188529 A1* | 7/2010 | Tsuruoka | H04N 5/217 348/234 |
| 2012/0140985 A1* | 6/2012 | Hattori | H04N 5/147 382/103 |
| 2013/0050540 A1* | 2/2013 | Kano | H04N 9/045 348/241 |

FOREIGN PATENT DOCUMENTS

| | | |
|---|---|---|
| CN | 1627323 A | 6/2005 |
| JP | 2007-129524 A | 5/2007 |

* cited by examiner

*Primary Examiner* — Nhan T Tran
*Assistant Examiner* — Chan Nguyen
(74) *Attorney, Agent, or Firm* — Miles & Stockbridge P.C.

(57) ABSTRACT

Enhancing the image quality by suitable color noise correction is realized without depending on a subject, a photographing scene, and photographing conditions by determining and correcting a color noise component according to photographing conditions of a camera. The present invention is configured of an imaging device that has: an imaging unit; a signal processing unit that performs signal processing on an image signal inputted from the imaging unit and outputs a luminance signal and a chrominance signal; a camera controlling unit that controls at least one of photographing conditions of optical conditions and exposure of the photographing unit and a signal processing condition of the signal processing unit; and a color noise correction unit that extracts and corrects a color noise component from the chrominance signal inputted from the signal processing unit. The camera control unit controls the color noise correction unit using information of the photographing conditions.

1 Claim, 23 Drawing Sheets

FIG.4A
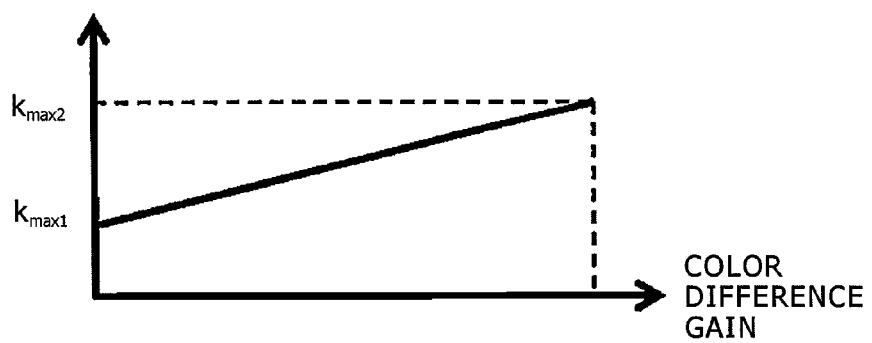
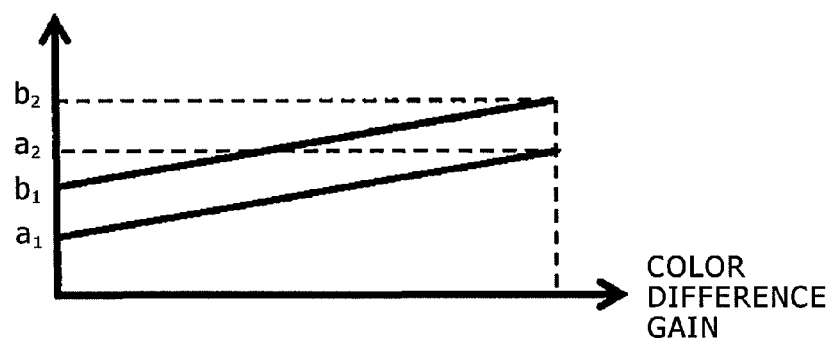

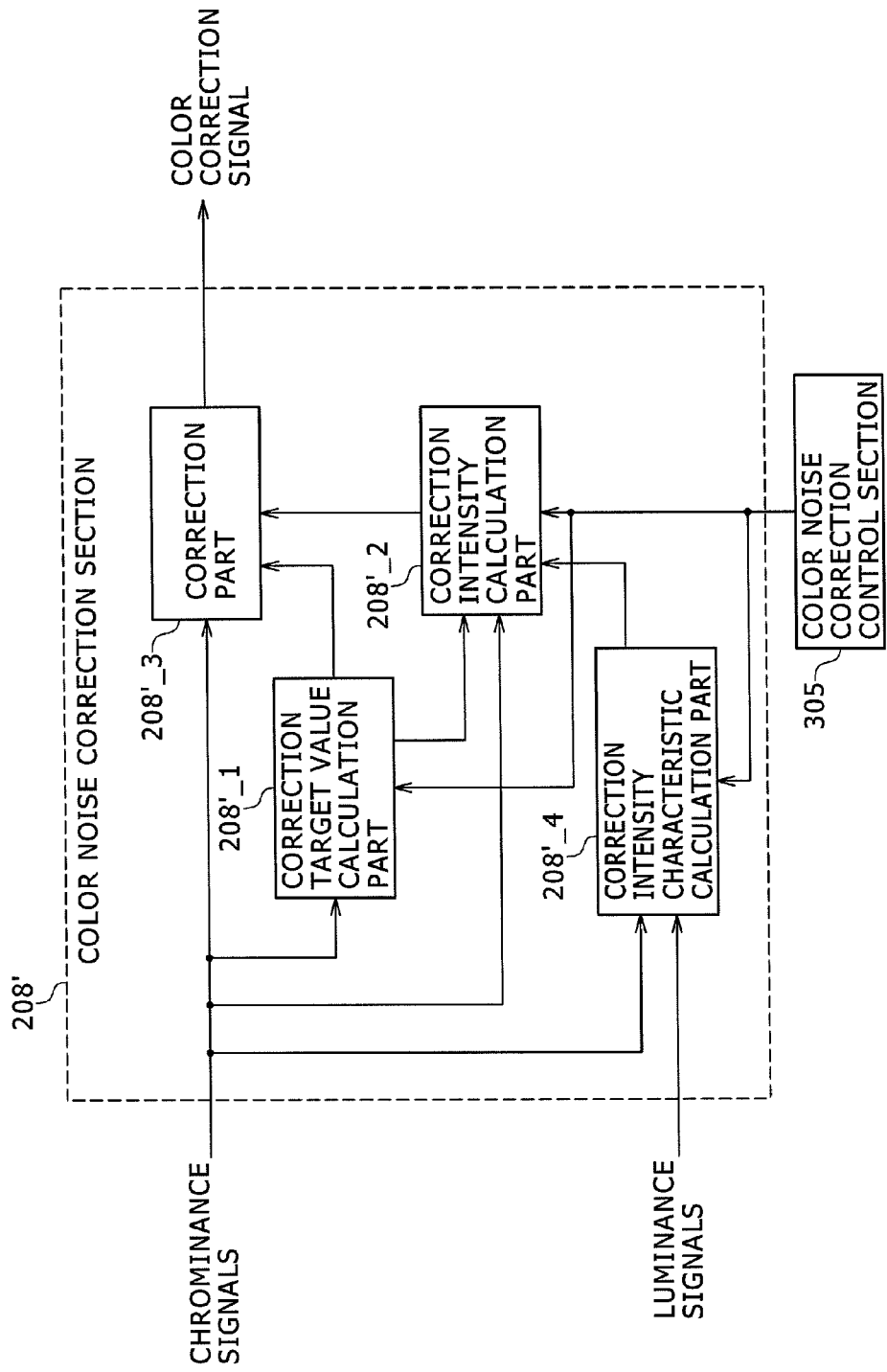

FIG.7A
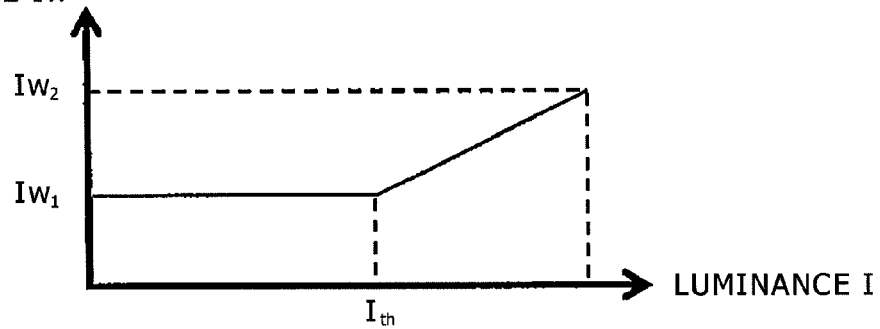
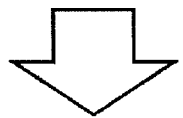
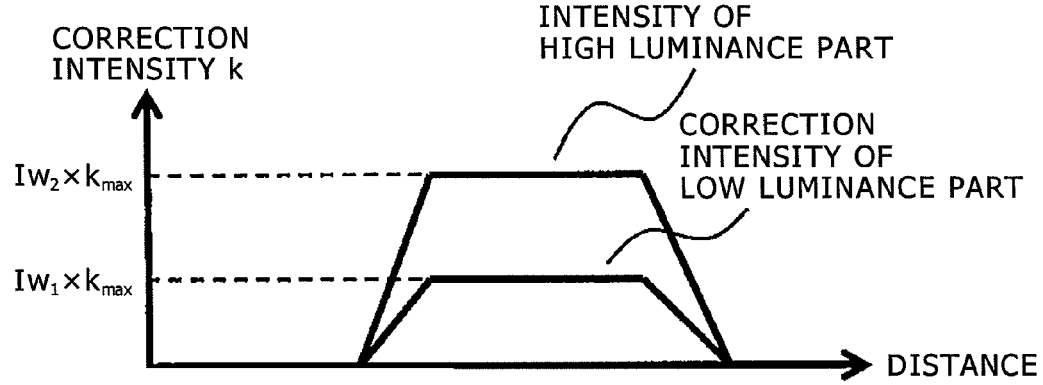

FIG.7B
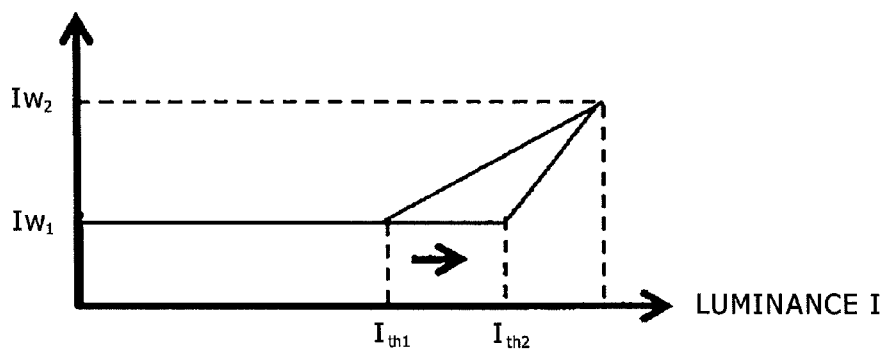
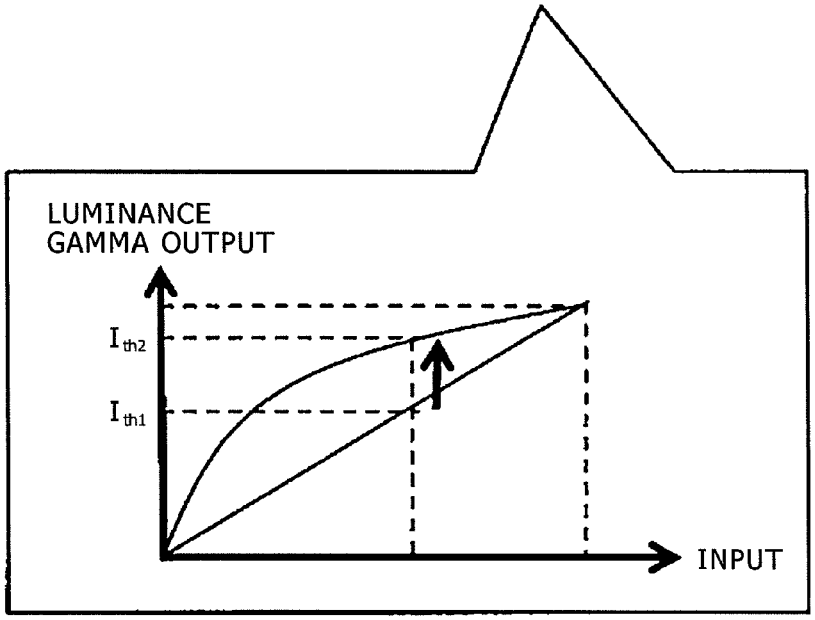

FIG.9B
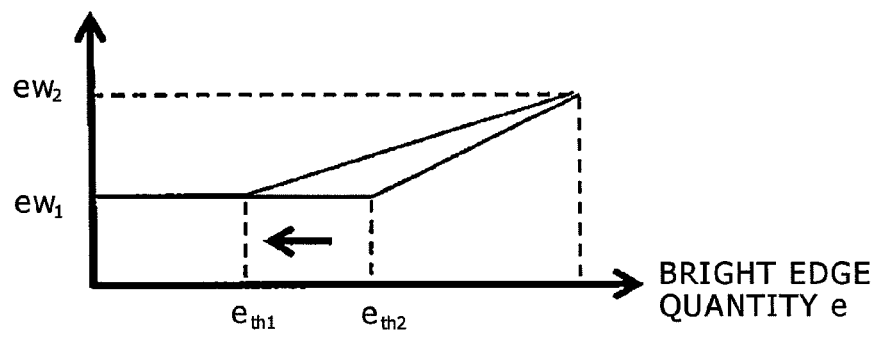
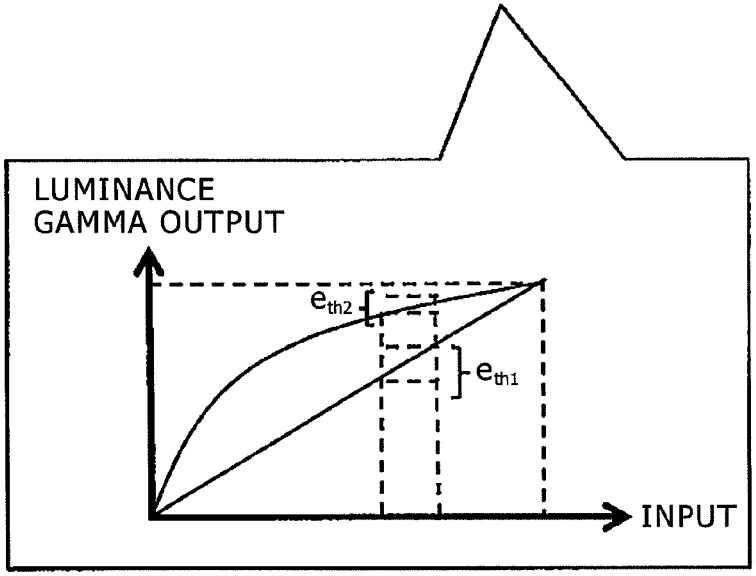

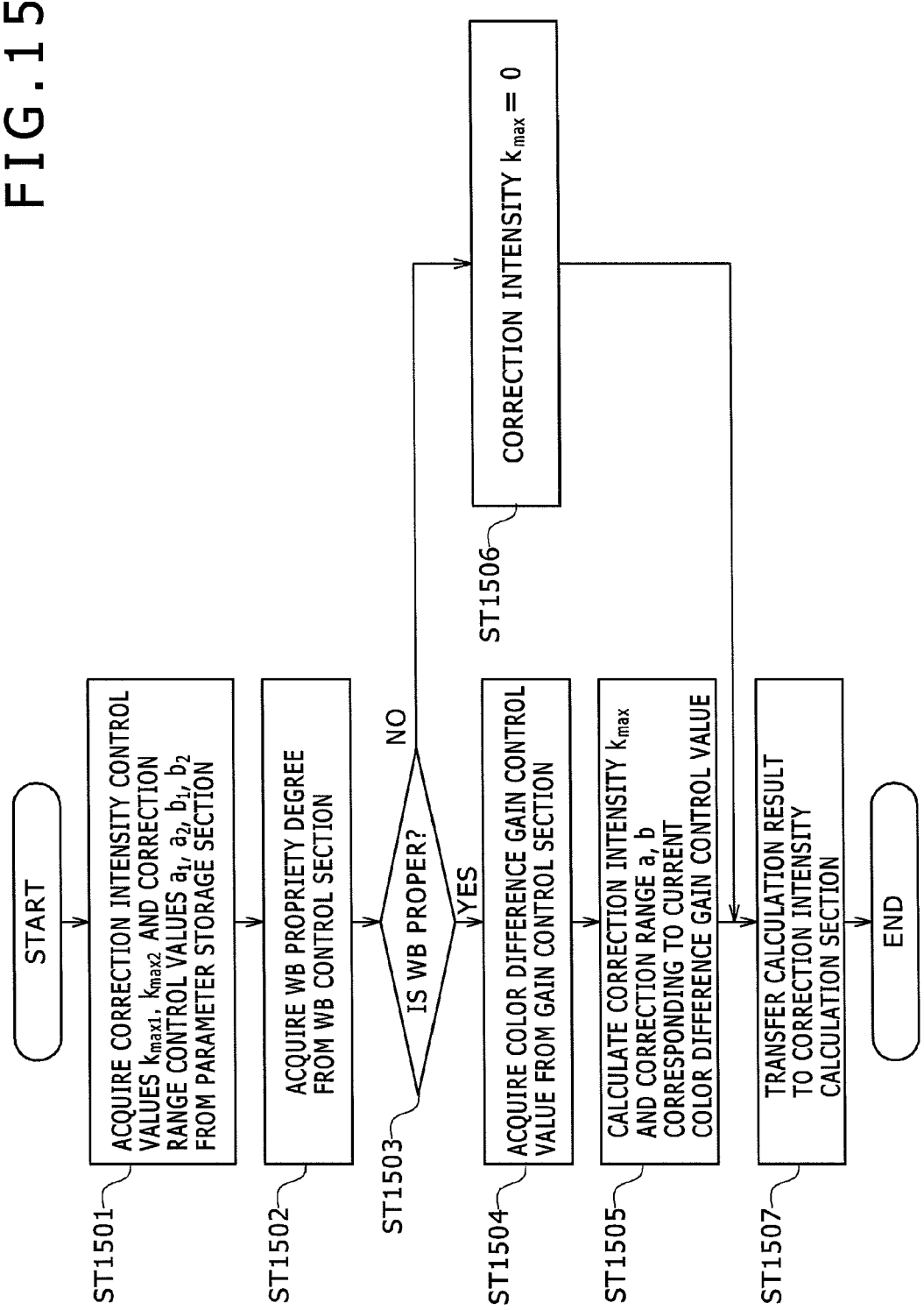

IMAGING DEVICE AND IMAGE SIGNAL PROCESSOR WITH COLOR NOISE CORRECTION

CROSS-REFERENCE TO RELATED APPLICATION

This application claims the Japanese Patent Application No. 2013-038134 filed Feb. 28, 2013, which is incorporated herein by reference in its entirety.

BACKGROUND

The present invention relates to an imaging device and an image signal processor.

As a background art of this technical field, there is Japanese Unexamined Patent Application Publication No. 2007-129524 (Patent Document 1). The application in the official report aims at "removing color noises suitably according to a gain of each signal of three primary colors": this digital camera performs smoothing processing by, when performing color noise removing processing, reading white balance gains Rc, Bc in step S310, subsequently reading the number of times of filter processing corresponding to each value of the white balance gains Rc, Bc in step S320, and performing low-pass filtering on color difference signals Cr, Cb by the read number of times of filter processing in step S330. Therefore, the color noise can be suitably removed even when a magnitude of the color noise varies by altering values of R and B using the white balance gains Rc, Bc.

SUMMARY

In an imaging device, improvement of an image quality of a sensed image can be realized by correcting color noises caused by variation in a chrominance signal. However, when processing of converting a signal level such as gain processing and gamma processing on the chrominance signal is performed in a pretreatment of color noise correction, a characteristic of the color noise also varies. Then, it is desirable to control color noise correction processing based on characteristics of the signal processing performed on the chrominance signal in the pretreatment of the color noise correction.

The above-mentioned Japanese Unexamined Patent Application Publication No. 2007-129524 has a problem that sufficient improvement effects cannot be attained such as occurrence of color mixture and falling of color reproduction in a contour portion.

The present invention provides an imaging device or an image signal processor capable of obtaining a higher quality image. For example, by determining and correcting a color noise component based on the characteristics of the pretreatment signal processing, enhancing the image quality by suitable color noise correction is realized without depending on a subject, a photographing scene, and photographing conditions.

Outlines of typical forms of the invention disclosed by this application can be briefly explained as follows:
(1) A form of the invention by this application is an imaging device, characterized by having: an imaging unit; a signal processing unit that generates a luminance signal and the chrominance signal by performing signal processing on an image signal inputted from the imaging unit; a controlling unit that controls at least one photographing condition among optical conditions and exposure of the photographing unit and an input-output characteristic of signal processing of the signal processing unit, in which the signal processing unit has a color noise correction unit that extracts and corrects a color noise component from the generated chrominance signal, and in which the controlling unit that controls correction parameters of correction by the color noise correction unit according to information of the photographing conditions.
(2) A form of the invention by this application is an image signal processor, characterized by having: an image input unit that inputs a sensed image; a control information input unit that inputs at least one photographing condition among optical conditions and exposure at the time of image taking of the sensed image and a signal processing condition of the signal processing; a color noise correction unit that extracts and corrects a color noise component of the image inputted from the image input unit; and a color noise correction control unit that controls correction conditions of the color noise component of the color noise correction unit, in which the color noise correction control unit controls the correction parameters of the correction by the color noise correction unit according to information of the photographing conditions acquired from the control information input unit.

According to the present invention, it is possible to provide an imaging device or an image signal processor capable of obtaining a high picture quality image.

BRIEF DESCRIPTION OF THE DRAWINGS

FIG. 4A is a diagram showing control of correction parameters of color noise correction processing that is linked with color difference gain control of the imaging device according to the first embodiment of the present invention;

FIG. 6 is a schematic diagram showing one example of a color noise correction section of an imaging device according to a second embodiment of the present invention;

FIG. 7A is a diagram showing calculation processing of a correction intensity according to luminance of the imaging device according to the second embodiment of the present invention;

FIG. 7B is a diagram showing control of a correction characteristic of the color noise correction processing that is linked with luminance gamma control of the imaging device according to the second embodiment of the present invention;

FIG. 9B is a diagram showing control of a correction characteristic of color noise correction processing that is linked with the luminance gamma control of the imaging device according to the third embodiment of the present invention;

FIG. 15 is a second diagram showing one example of the color noise correction control processing sequence of the imaging device according to the fourth embodiment of the present invention;

DETAILED DESCRIPTION

Hereinafter, imaging devices according to embodiments of the present invention will be explained using drawings.

First Embodiment

Figure 1:
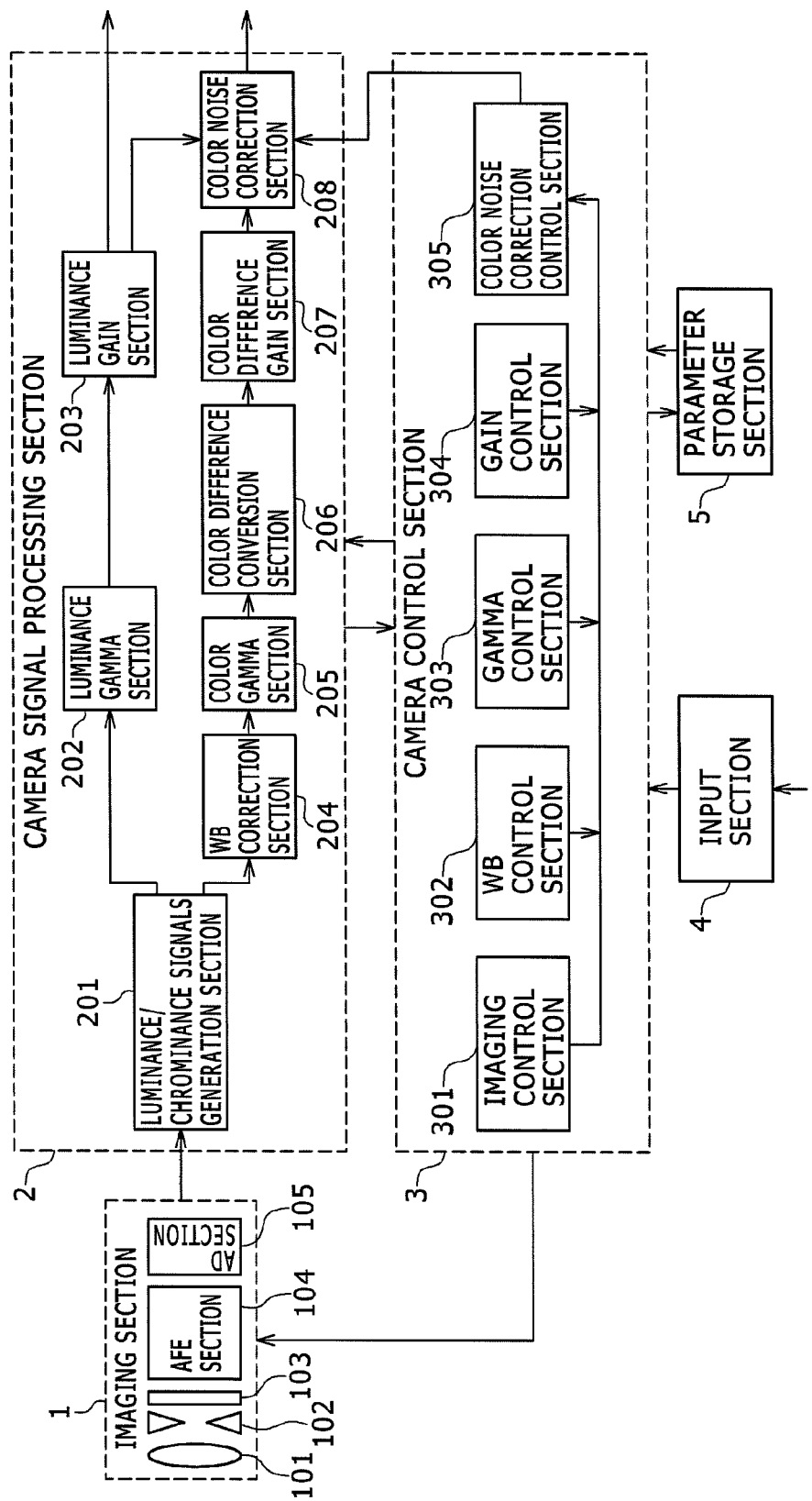
FIG. 1 is a schematic diagram showing an imaging device according to a first embodiment of the present invention.

FIG. 1 is a schematic diagram showing an imaging device according to a first embodiment of the present invention. The imaging device according to this embodiment is configured by using accordingly an imaging section 1, a camera signal processing section 2, a camera control section 3, an input section 4, and a parameter storage section 5. Incidentally, arrows between components in FIG. 1 are not necessarily restricted to those shown in FIG. 1, but may be deleted or altered accordingly according to modifications such as addition, deletion, substitution, etc. of the components.

The imaging section 1 is configured by using accordingly, for example, a lens 101, an iris 102, an imaging element 103, an AFE section 104, and an AD section 105, performs photoelectric conversion on an optical image obtained by receiving light with the imaging element 103 such as CCD and CMOS through the lens 101 and the iris 102, performs analog signal processing in the AFE section such as CDS and AGC, converts it into a digital signal in the AD section 105, and outputs the digital signal as imaging data. Incidentally, the configuration of the imaging section 1 shown in FIG. 1 is one example to the last: for example, in order to make a zoom magnification and a focusing position variable, the lens 101 can be a lens group comprised of multiple zoom lenses and focus lenses. Moreover, conversely, the lens 101 can be one sheet of pan focus lens. Alternatively, a configuration that does not have the iris 102 can be adopted. Even when a component of the imaging section 1 is selected according to necessity/unnecessity of the zoom magnification, the focusing position, an adjustment function of a diaphragm, the present invention can be applied without any problem.

The camera signal processing section 2 is one that generates a picture signal from the imaging data inputted from the imaging section 1 by performing signal processing based on predetermined input-output characteristic, and outputs it in an unillustrated picture display part, an image recording part, an image compression part, etc., and is configured by using accordingly, for example, a luminance/chrominance signal generation section 201, a luminance gamma section 202, a luminance gain section 203, a WB correction section 204, a color gamma section 205, a color difference conversion section 206, a color difference gain section 207, and a color noise correction section 208.

The luminance/chrominance signal generation section 201 generates a luminance signal and a chrominance signal by performing a matrix operation on the imaging data inputted from the imaging section 1. The luminance signal is a signal showing, for example, a luminance value for each pixel; the chrominance signal is a signal showing, for example, magnitudes of RGB components for each pixel. On the generated luminance signal, gamma processing is performed by the luminance gamma section 202 and gain processing is performed by the luminance gain section 203 to correct the luminance signal. On the other hand, on the generated chrominance signal, the following pieces of processing are performed, respectively, to correct the chrominance signal: the gain processing for each component of the RGB components in the WB correction section 204; the gamma processing in the color gamma section 205; matrix arithmetic operation processing for converting the chrominance signal of the RGB components into a color difference signal in the color difference conversion section 206; the gain processing for the color difference signals in the color difference gain section 207; and color noise correction processing in the color noise correction section 208. Details of the color noise correction processing in the color noise correction section 208 will be described later using FIG. 2.

The camera signal processing section 2 can output the luminance signal and the chrominance signal that are in a high picture quality and are compatible with predetermined formats as a picture signal by these processings. Incidentally, a configuration of the camera signal processing section 2 shown in FIG. 1 is one example to the last, indicating a part of main signal processing. Therefore, a turn of the signal processing and the number of times of processing may be changed, and unillustrated signal processing may be added. For example, a configuration where the luminance gain processing is performed not only in a subsequent stage of the luminance gamma processing but also in a preceding stage, so that normalization of the signal level of the luminance signal can be adjusted before nonlinear processing is performed may be adopted. Moreover, an average of signals, a frequency distribution, and a degree of high frequency components, etc. may be calculated in a process of each signal processing or in the preceding and subsequent stages, and these values may be outputted to the camera control section 3 as a brightness evaluation value, a focusing evaluation value, and a white balance evaluation value. In this case, the below-mentioned camera control section 3 can control focusing, exposure, and an input-output characteristic of signal processing by referring to the evaluation values. Moreover, the camera signal processing section 2 may attain further enhancement of an image quality by performing processing such as luminance noise correction processing, tone mapping processing, and edge enhancement processing, or by performing wide dynamic range processing and three-dimensional noise reduction processing with the use of information of pictures that are photographed at different timings through unillustrated picture memory. Moreover, enhancement of the image quality may be attained by performing digital zoom processing, subject recognition processing, etc. in the process of each signal processing and in a subsequent stage. Even when components of the camera signal processing section 2 are chosen according to such an image quality target or necessity/unnecessity of a function, the present invention can be applied without any problem provided that it has the color noise correction section 208.

The camera control section 3 is one that controls photographing conditions of the imaging section 1 and the camera signal processing section 2 by using the evaluation value acquired from the camera signal processing section 2, user inputted information acquired from the input section 4, etc. For example, the camera control section 3 is configured by accordingly using an imaging control section 301, a WB control section 302, a gamma control section 303, a gain control section 304, and a color noise correction control section 305. Here, the photographing conditions show optical conditions in the imaging section 1, a state of exposure, an input/output characteristic, etc. of each signal processing in the camera signal processing section 2. That is, the photographing conditions show various kinds of parameters, for example, corresponding to: the zoom magnification and a focus position of the lens 101 in the imaging section 1; an amount of diaphragm of the iris 102, i.e., an F value; a shutter time and a sensitivity characteristic of the imaging element 103; an analog gain of the AFE section 104; a matrix coefficient of matrix processing, a gain quantity of the gain processing, and a gamma characteristic of the gamma processing in the camera signal processing section 2; a correction intensity of the color noise correction section 208; etc.

The imaging control section 301 controls the focus position of the lens 101 and the amount of diaphragm of the iris 102 in the imaging section 1, the shutter time and the sensitivity characteristic of the imaging element 103, the analog gain of the AFE section 104, etc. using the focusing evaluation value and the brightness evaluation value acquired from the camera signal processing section 2 so that these evaluation values may approach predetermined target values. As the focusing evaluation value, for example, an integration value of high frequency components of the luminance signal can be used, and the focus position at which the focusing evaluation value becomes a maximum can be regarded as the focusing position to a principal subject. Moreover, as the brightness evaluation value, for example, an average of luminance signals and a frequency distribution can be used, and the amount of diaphragm, the shutter time, and the analog gain at which the brightness evaluation value approaches a predetermined level or distribution can be regarded as proper exposure. By this, focusing and exposure that are suitable for the scene or the subject can be realized automatically. Alternatively, the imaging control section 301 controls the zoom magnification and the focus position of the lens 101, the shutter time and the sensitivity characteristic of the imaging element 103, and the analog gain of the AFE section 104 based on the user inputted information acquired from the input section 4. This enables the user to perform a desired adjustment manually.

The WB control section 302 controls the gain quantity for each component of the RGB components of the WB correction section 204 in the camera signal processing section 2 so that the white balance evaluation value acquired from the camera signal processing section 2 may approach a predetermined target value. This makes it possible to realize the white balance that is suitable for the scene or the subject automatically. As the white balance evaluation value, for example, an average hue and an average saturation of the chrominance signal of an achromatic subject can be used, and the gain quantities of respective components of the RGB components by which the white balance evaluation value approaches most an achromatic color can be regarded as optimal gain quantities. This enables the white balance correction to be realized automatically even when a color temperature of a photographing scene fluctuates. Alternatively, the gamma control section 303 may be configured to control the gain quantity of each component of the RGB components of the WB correction section 204 in the camera signal processing section 2 based on the user inputted information acquired from the input section 4 and allow the user to perform a desired adjustment manually even when attaining white balance by automatic adjustment is difficult in such a case where there exist light sources of multiple color temperatures. The gamma control section 303 controls the gamma characteristic to the luminance signal of the luminance gamma section 202 in the camera signal processing section 2 and the gamma characteristic to the chrominance signal of the color gamma section 205, respectively, based on the user inputted information acquired from the input section 4. This makes it possible to adjust the brightness and color strength of a low illumination subject manually. Alternatively, the control may be performed linked with information of exposure control of the imaging control section 301. Moreover, the input-output characteristic is not limited to gamma, and the exposure control may be modified so that visibility in an area of a desired brightness may be improved by altering the characteristic to become a nonlinear tone curve and elongating signals in a desired area such as a dark place and a bright place.

The gain control section 304 controls the gain quantity to the luminance signal of the luminance gain section 203 in the camera signal processing section 2 and a gain characteristic to the color difference signal of the color difference gain section 207, respectively. This makes it possible to adjust luminance and color strength of the entire picture manually. Alternatively, the control may be performed linked with information of the exposure control of the imaging control section 301. The color noise correction control section 305 controls correction parameters of color noise correction of the color noise correction section 208 in the camera signal processing section 2 using other photographing conditions, i.e., control information of optical conditions or exposure in the imaging control section 301, or control information of the white balance in the WB control section 302, or control information of gamma in the gamma control section 303, or control information of gain in the gain control section 304. This makes it possible to correct the color noise that varies depending on optical characteristics such as the zoom magnification, the focus position, and the amount of diaphragm, exposure characteristics such as the amount of diaphragm, a shutter speed, and an analog gain quantity, and the input-output characteristics of signal processing such as the gamma and the gain and to improve the image quality by suitably reducing the color noise regardless of the photographing scene and the subject. Incidentally, details of color noise correction control of the color noise correction control section 305 will be described later using FIG. 2. Moreover, in each control of the camera control section 3, for the coefficients etc. used for the target value and the arithmetic operation of the control, the parameters saved in the parameter storage section 5 are read and used.

The input section 4 inputs a user input into the camera control section 3 from unillustrated user input devices such as a button and a touch panel and unillustrated external apparatuses such as LAN and RS-232C. This makes it possible for the camera control section 3 to perform the followings: changing a target value and a characteristic of the control based on the user input in each control; switching the automatic control and the manual control; and deciding a control value of the manual control.

The parameter storage section 5 has a nonvolatile recording medium, and stores a target value of the control that the camera control section 3 uses and coefficients used in arithmetic operations, etc. Thereby, by changing various kinds of parameters that the parameter storage section 5 records, adjustment after shipment and individual adjustment for each camera become easy. Moreover, the parameter storage section 5 may store correspondence of the photographing conditions and the correction parameters at a time when the color noise correction control section 305 controls the correction parameters according to another photographing conditions of the camera control section 3, as table data. At this time, by using a method whereby, when the other photographing conditions of the camera control section 3 are predetermined photographing conditions, the color noise correction control section 305 reads and uses corresponding correction parameters, and whereby, when there are no corresponding predetermined photographing conditions, it uses a correction parameter corresponding to photographing conditions of a vicinity or a correction parameter obtained by interpolation calculating the correction parameters corresponding to photographing conditions of multiple vicinities, it can reduce an arithmetic operation cost and can attain shortening of a processing time and reduction of a program capacity.

Figure 2:
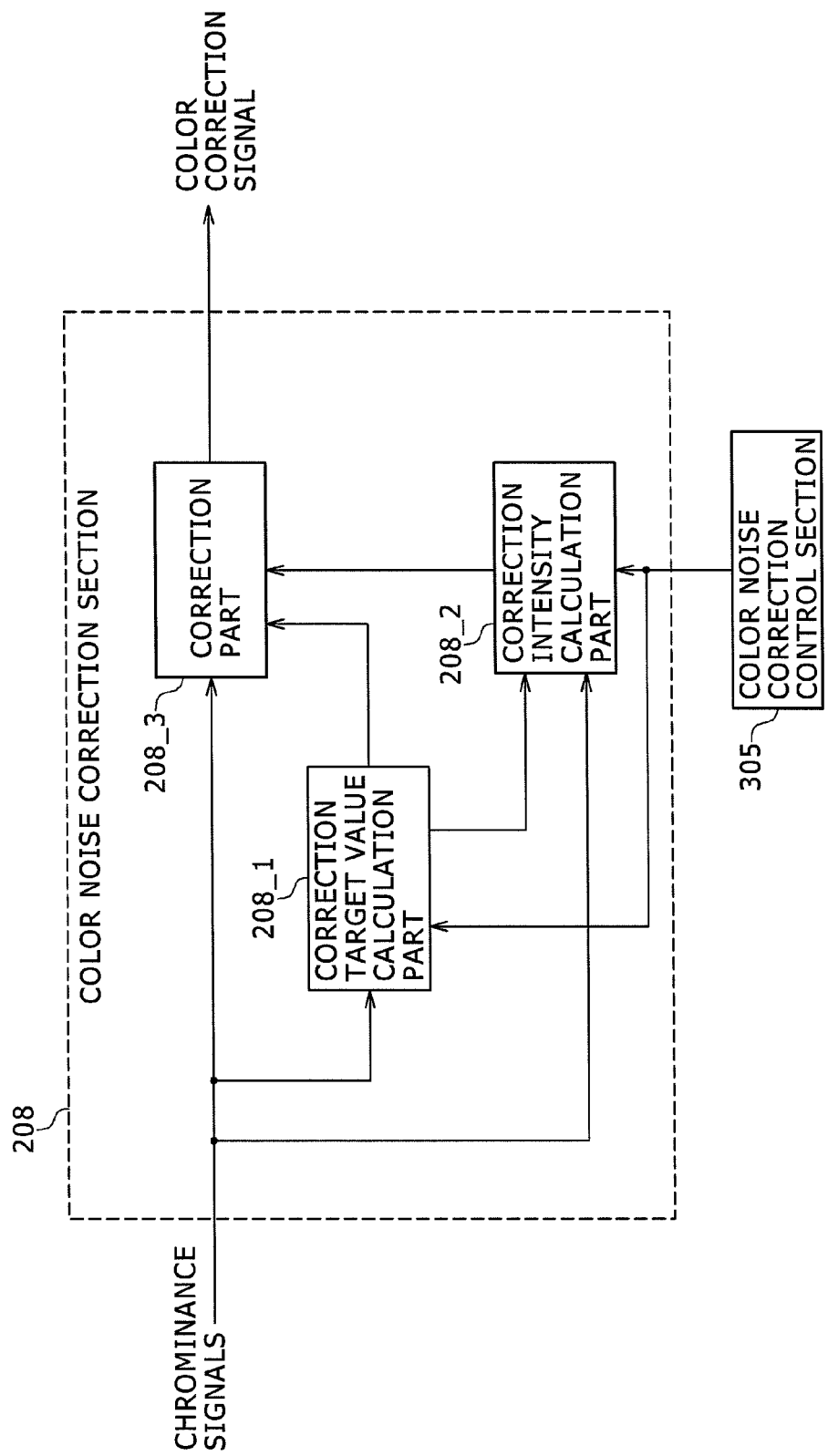
FIG. 2 is a schematic diagram showing one example of a color noise correction section of the imaging device according to the first embodiment of the present invention.

FIG. 2 is a schematic diagram showing one example of details of the color noise correction section 208 of the imaging device according to the first embodiment of the present invention, and in order to show one example of the color noise correction processing of the color noise correction section 208, only the color noise correction section 208 and the color noise correction control section 305 of the imaging device shown in FIG. 1 are extracted and indicated.

The color noise correction section 208 is configured by accordingly using a correction target value calculation part 208_1, a correction intensity calculation part 208_2, and a correction part 208_3. The correction target value calculation part 208_1 calculates a correction target value from the chrominance signal inputted from the color difference gain section 207. The correction target value is a target value of a chrominance signal after the color noise correction about the target pixel, being ideally a chrominance signal free from color noises. The correction target value can be calculated, for example, from an average of the chrominance signals in a vicinity area of the target pixel, and in this case, a chrominance signal with a reduced influence of the noise whose magnitude is different in a section of pixel can be acquired. Moreover, since there is a possibility that multiple subjects each having a different color may exist in an area where the outline of the subject or a pattern exists, an average of the chrominance signals of only pixels in a vicinity area of the target pixel such that differences between the chrominance signals and that of the target pixel are less than or equal to a predetermined threshold may be used instead, and it is possible to exclude an influence of a subject having a different color from that of the target pixel in this case. At this time, as the threshold, a previously decided fixed value, a value decided based on the correction parameters that the correction target value calculation part 208_1 acquired from the color noise correction control section 305, etc. can be used. Based on the correction parameters acquired from the color noise correction control section 305, the correction intensity calculation part 208_2 estimates a color noise component by comparing the correction target value calculated by the correction target value calculation part 208_1 and the chrominance signal of the target pixel, and decides the correction intensity in the target pixel. A deciding method of the correction intensity will be described later using FIG. 3. Using the correction target value calculated by the correction target value calculation part 208_1 and the correction intensity decided in the correction intensity calculation part 208_2, the correction part 208_3 corrects the chrominance signal of the target pixel and outputs them. The correction of the chrominance signal of the target pixel can be realized, for example, by bringing the chrominance signal of the target pixel close to the correction target value at a ratio according to a magnitude of the correction intensity. This makes it possible for the color noise correction section 208 to estimate and correct the color noise component of the chrominance signal according to the correction parameters controlled by the color noise correction control section 305.

Figure 3:
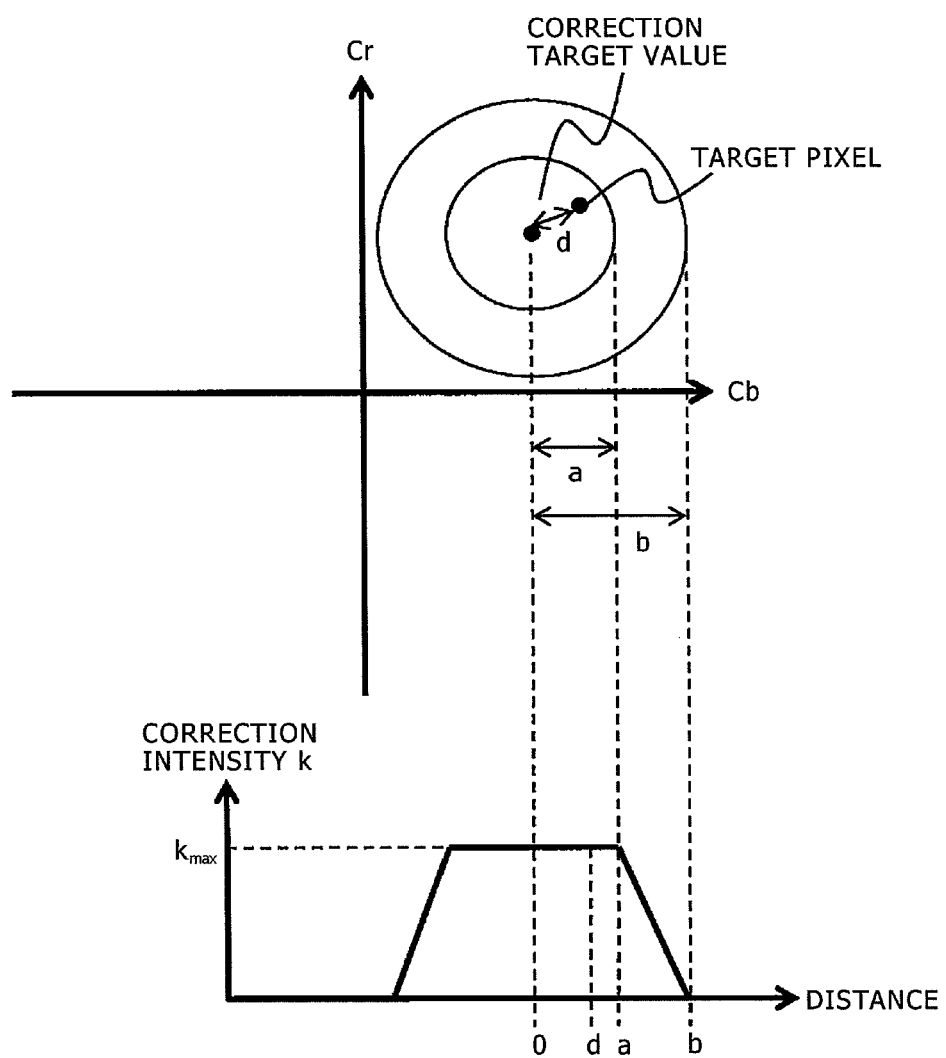
FIG. 3 is a diagram showing one example of color noise correction intensity determination processing of the imaging device according to the first embodiment of the present invention.

FIG. 3 is a diagram showing one example of color noise correction intensity determination processing of the imaging device according to the first embodiment of the present invention.

The color noise correction intensity determination processing shown in FIG. 3 is executed by the correction intensity calculation part 208_2 shown in FIG. 2. In FIG. 3, a represents a first threshold for color noise estimation, b represents a second threshold for color noise estimation, and d represents a difference between the chrominance signal of the target pixel and the correction target value in a color difference space, and the figure shows a relationship between the difference d between the chrominance signal of the target pixel and the correction target value in the color difference space, and the correction intensity k decided by the color noise correction intensity determination processing. The color noise estimation is performed by comparing the difference d between the chrominance signal of the target pixel and the correction target value with a first threshold a and a second threshold b. That is, when the difference d between the chrominance signal of the target pixel and the correction target value is smaller than a first threshold a, it is estimated that d is a color noise component occurring in the chrominance signal of the target pixel, and the correction intensity is maximized; when the difference d is larger than a second threshold b, it is estimated that there is an influence other than the color noise, namely the multiple subjects having different colors exist in a vicinity area of the target pixel, and the correction intensity is minimized; and when the difference d is larger than the first threshold a and is smaller than the second threshold b, it is estimated that there is a possibility that the both influences coexist, and the correction intensity is decided so as to become gradually smaller as a value of the difference d becomes larger. By using the correction intensity thus decided, the correction part 208_3 can reduce the color noise component of the chrominance signal in a flat part of the subject, and on the other hand, can inhibit a fall of color reproduction in the outline part of the subject. Moreover, the color noise correction control section 305 considers a characteristic of a noise level of the color noise as correction parameters, can control the correction range in which the color noise is estimated and corrected by controlling the first threshold a and the second threshold b, and can control a strength of the color noise correction by controlling a maximum value $k_{max}$ of the correction intensity. Therefore, by controlling these correction parameters according to the photographing conditions of the camera control section 3, the correction can be performed even if a characteristic of the color noise varies because the photographing conditions change, and it becomes possible to suitably control the color noise correction that does not depend on the photographing scene and the subject.

Figure 4B:
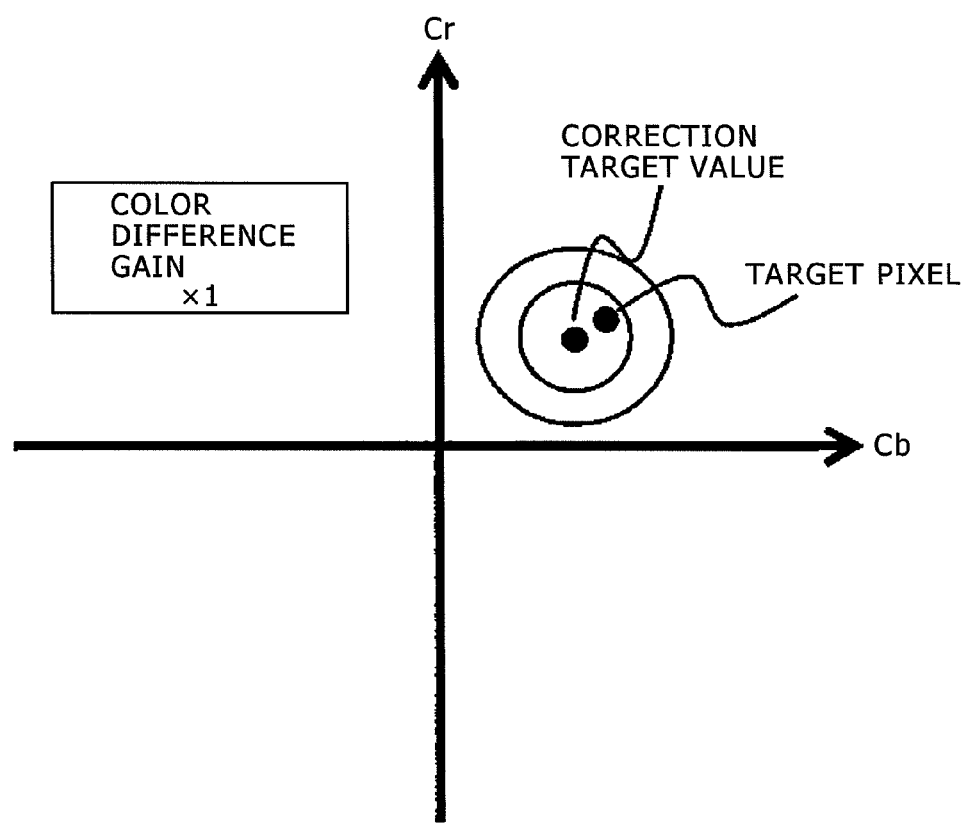
FIG. 4B is a diagram showing a correction range in a color difference space in the case where a color difference gain of the imaging device according to the first embodiment of the present invention is unity.
Figure 4C:
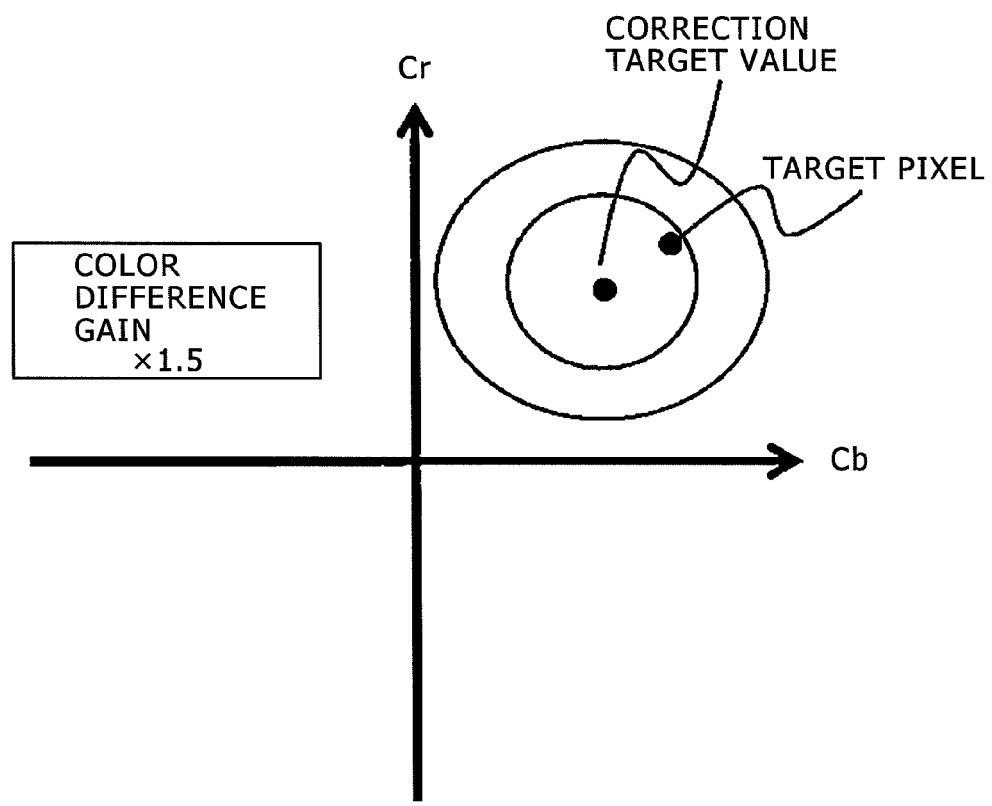
FIG. 4C is a diagram showing the correction range in the color difference space in the case where the color difference gain of the imaging device according to the first embodiment of the present invention is 1.5 times.

FIGS. 4A to 4C are diagrams showing one example of color noise correction control processing of the imaging device according to the first embodiment of the present invention. FIGS. 4A to 4C show an example of a case where the camera control section 3 controls the color noise correction section 208 being linked with control of a color difference gain quantity of the color difference gain section 207 in the camera signal processing section 2 as one example of the color noise correction control processing that is linked with the control of the photographing conditions in the camera control section 3. In FIGS. 4A, 4B, and 4C, FIG. 4A is a diagram showing control of the correction parameters of the color noise correction processing that is linked with color difference gain control, FIG. 4B is a diagram showing the correction range in the color difference space when a color difference gain is one time, and FIG. 4C is a diagram showing the correction range in the color difference space when the color difference gain is 1.5 times. The color noise correction control processing shown in FIG. 4A is executed by the color noise correction control section 305 shown in FIG. 1 or FIG. 2.

As shown in FIG. 4A, the color noise correction control section 305 controls so that as the color difference gain becomes large, the maximum value $k_{max}$ of the correction intensity, the first threshold a, and the second threshold b may become large. For example, when the color difference gain shown in FIG. 4C is 1.5 times in contrast to a case where the color difference gain shown in FIG. 4B is one time, the difference d between the chrominance signal of the target pixel and the correction target value becomes 1.5 times. At this time, by the color noise correction control section 305 controlling also the correction range to increase by 1.5 times, it is possible to estimate the color noise similarly in either case of the color difference gain. Thereby, in the case where when camera control enlarges the color difference gain by the result of the automatic control or the manual control of the user's operation, even when a variation in the chrominance signal that arises from the color noise due to enlargement of the color difference gain becomes large, it becomes possible to acquire the same effect of the color noise correction.

Incidentally, in the example of FIG. 4A, based on correction intensity control values $k_{max1}$, $k_{max2}$ and correction range control values $a_1$, $a_2$, $b_1$, and $b_2$ that correspond to the correction intensity and the correction range when the color difference gain is a minimum value or a maximum value, respectively, the maximum value $k_{max}$, the first threshold a, and the second threshold b of the correction intensity corresponding to the current color difference gain are calculated by the interpolation operation. At this time, there may be adopted a configuration where multiple correction intensity control values and correction range control values corresponding to multiple (more than or equal to three) color difference gains are prepared and the correction intensity and the correction range corresponding to the current color difference gain are calculated by interpolating control values in its vicinity. Moreover, there may also be adopted a configuration where a relationship of the color difference gain with the correction intensity and the correction range is approximated with a function, and the correction intensity and the correction range corresponding to the current color difference gain are calculated based on the function using a coefficient of the function as a control value. Since performing such an operation increases an approximate accuracy of the noise level even when the noise level varies nonlinearly to the color difference gain, it becomes possible to perform the correction of the color noise with high precision.

Figure 5:
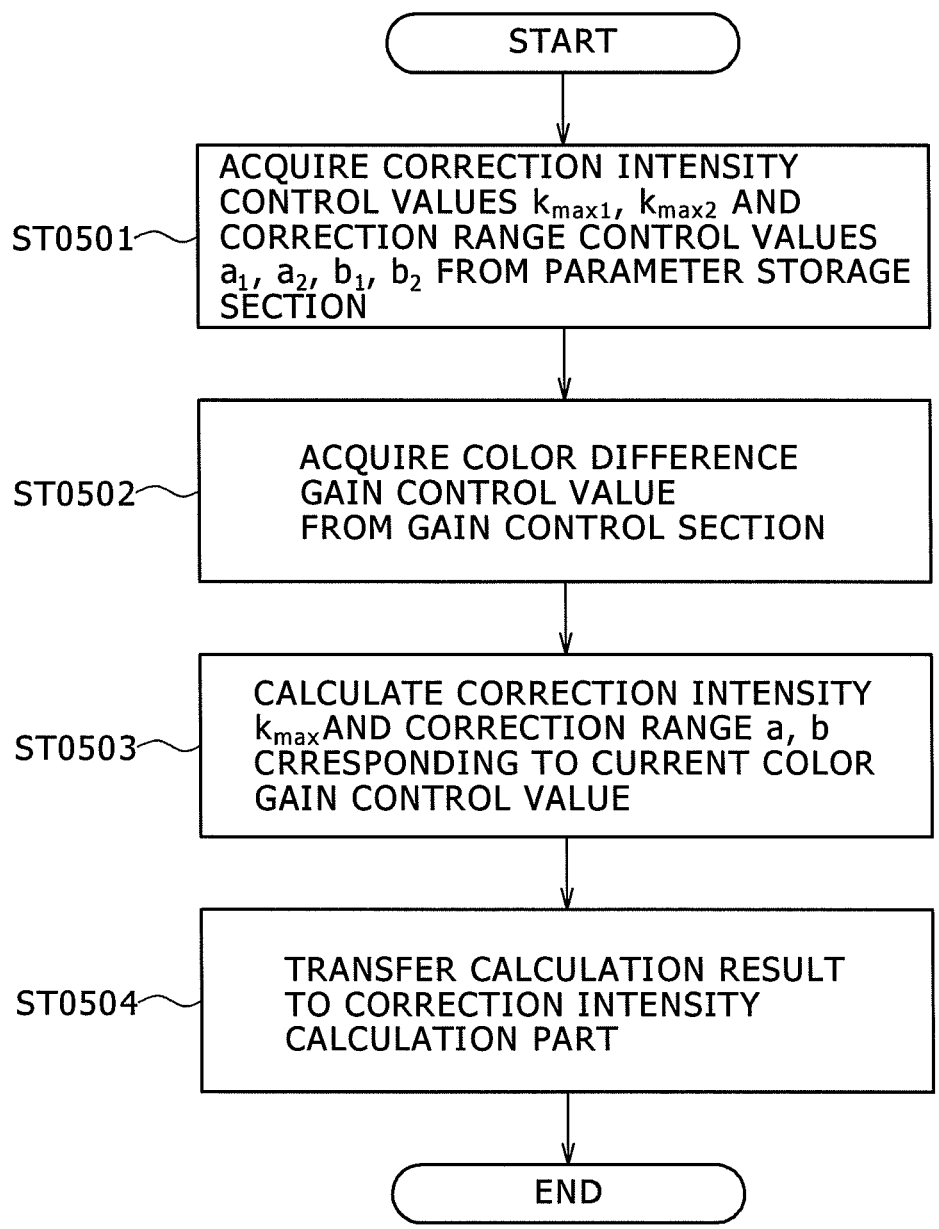
FIG. 5 is a diagram showing one example of a color noise correction control processing sequence of the imaging device according to the first embodiment of the present invention.

FIG. 5 is a diagram showing one example of a color noise correction control processing sequence of the imaging device according to the first embodiment of the present invention. The color noise correction control processing sequence shown in FIG. 5 is executed by the color noise correction control section 305 shown in FIG. 1 or FIG. 2. In the color noise correction control processing sequence shown in FIG. 5, the correction intensity control values $k_{max1}$, $k_{max2}$ and the correction range control values $a_1$, $a_2$, $b_1$, and $b_2$ are acquired from the parameter storage section 5, respectively, in step ST0501. In step ST0502, a control value of the color difference gain is acquired from the gain control section 304. In step ST0503, the correction intensity $k_{max}$ and the correction ranges a, b corresponding to a current control value of the color difference gain are calculated from a characteristic as shown in FIG. 4A using the correction intensity control values $k_{max1}$, $k_{max2}$ and the correction range control values $a_1$, $a_2$, $b_1$, and $b_2$. In step ST0504, the calculation result is transferred to the correction intensity calculation part 208_2. This makes it possible for the correction intensity calculation part 208_2 to calculate an optimal correction intensity timely to the control value of the color difference gain. Incidentally, acquisition of the correction intensity control value and the correction range control value from the parameter storage section 5 is not limited to one that is executed each time, and the acquisition may be performed only when the power supply is turned on or only when a value stored in the parameter storage section 5 is updated, which is intended to reduce a processing load.

Incidentally, although FIG. 4 and FIG. 5 showed the example of the case where the color noise correction section 208 was controlled being linked with control of a quantity of the color difference gain of the color difference gain section 207 in the camera signal processing section 2, the color noise correction section 208 can be controlled similarly being linked with control of another photographing conditions. For example, considering that a variation in color noises becomes large also by the amount of diaphragm of the iris 102 and the analog gain quantity in the AFE section 104 shown in FIG. 1, the color noise correction control section 305 may acquire the control value of the exposure control such as the amount of diaphragm, the analog gain quantity, the shutter time, and the input-output characteristic of the imaging element, and may control the correction parameters of the color noise correction section 208. Moreover, the correction parameters of the color noise correction section 208 may be controlled by acquiring the control values of multiple photographing conditions and using them in combination. In that case, the imaging device can perform being linked with the control values of the multiple photographing conditions, for example, by storing the correction intensity control value and the correction range control value that are to be stored in the parameter storage section 5 as two-dimensional information corresponding to two axes of the color difference gain and the analog gain and by the correction intensity calculation part 208_2 calculating the correction strength and the correction range corresponding to the current color difference gain and the analog gain by the interpolation operation. Alternatively, it is also possible to correct the color noise in consideration of the characteristic of the color noise according to the entire photographing conditions by controlling the correction parameters of the color noise correction section 208 stepwisely to the control values of multiple photographing conditions. In that case, for example, the correction intensity control value and the correction range control value that are to be stored in the parameter storage section 5 are stored individually, as one-dimensional information to the color difference gain and one-dimensional information to the analog gain. The correction intensity calculation part 208_2 first calculates the correction intensity and the correction range corresponding to the current color difference gain by the interpolation operation, and then performs an operation of correction correspondingly to the current analog gain. Thereby the imaging device can perform an operation that is linked with control values of the multiple photographing conditions. In this case, it is possible to reduce the number of parameters that are stored when the number of the control values increases.

Moreover, the color noise correction section 208 may control the correction parameters other than the correction range and the correction intensity being linked with control of other photographing conditions. For example, when the correction target value calculation part 208_1 calculates the correction target value, in the case where an average of the chrominance signals of only pixels such that a difference of the chrominance signal between the pixel and the target pixel is less than or equal to a predetermined threshold in a vicinity area of the target pixel is used instead, by controlling the threshold being linked with the control of other photographing conditions, it is possible to suitably exclude an influence of a subject having a different color from that of the target pixel even when the photographing conditions of the camera may change.

Thus, according to this embodiment, by controlling the correction parameters of the color noise correction according to the photographing conditions of the camera, it becomes possible to always perform suitable color noise correction even when the photographing scene or the subject changes even when the photographing scene or the subject changes, and thereby to improve the image quality.

Second Embodiment

FIG. 6 is a schematic diagram showing one example of a color noise correction section of an imaging device according to a second embodiment of the present invention. Other components of the imaging device according to the second embodiment are the same as those of the first embodiment, and the same component is given the same number and its explanation is omitted accordingly. Here, the color noise correction section that is different will be mainly explained. FIG. 6 extracts and indicates only a color noise correction section 208' and the color noise correction control section 305 of the imaging device in order to show one example of color noise correction processing of the color noise correction section 208'.

The color noise correction section 208' is configured by accordingly using a correction target value calculation part 208'_1, a correction intensity calculation part 208'_2, a correction part 208'_3, and a correction intensity characteristic calculation part 208'_4, and a difference thereof in configuration from a schematic diagram showing one example of the color noise correction section of the imaging device according to the first embodiment of the present invention shown in FIG. 2 is that the color noise correction section 208' has the correction intensity characteristic calculation part 208'_4. The correction target value calculation part 208'_1 and the correction part 208'_3 perform the same operations as those of the schematic diagram showing one example of the color noise correction section of the imaging device according to the first embodiment of the present invention shown in FIG. 2. The correction intensity characteristic calculation part 208'_4 calculates a characteristic of the correction intensity calculated by the correction intensity calculation part 208'_2 according to the luminance signal inputted from the luminance gain section 203 or the chrominance signal inputted from the color difference gain section 207. The correction intensity characteristic calculation part 208'_4 may calculate the characteristic of the correction intensity calculated by the correction intensity calculation part 208'_2 according to a feature quantity such as a specific frequency component obtained by performing band-pass filter processing and high-pass filter processing on the luminance signal or the chrominance signal instead of the luminance signal and the chrominance signal. Based on the correction parameters acquired from the color noise correction control section 305 and the characteristics of the correction intensity acquired from the correction intensity characteristic calculation part 208'_4, the correction intensity calculation part 208'_2 estimates a color noise component by comparing the correction target value calculated by the correction target value calculation part 208'_1 and the chrominance signal of the target pixel, and decides the correction intensity in the target pixel. This makes it possible for the color noise correction section 208' to estimate and correct the color noise component of the chrominance signal according to the correction parameters controlled by the color noise correction control section 305, and makes it possible to make the correction characteristic different according to the luminance and color of the input signal. That is, it becomes possible, for example, to strengthen or weaken the correction intensity of a pixel that has luminance, or hue, or saturation in a specific range.

FIGS. 7A and 7B are diagrams showing one example of color noise correction control processing of the imaging device according to a second embodiment of the present invention. As one example of the color noise correction control processing that is linked with control of the photographing conditions in the camera control section 3, FIGS. 7A and 7B show an example of a case where the imaging device controls the color noise correction section 208' with the color noise correction section 208' configured so as to vary the correction intensity according to the luminance, being linked with control of a gamma characteristic of luminance gamma of the luminance gamma section 202 in the camera signal processing section. In FIGS. 7A and 7B, FIG. 7A is a diagram showing calculation processing of the correction intensity according to the luminance, and FIG. 7B is a diagram showing control of a correction characteristic of the color noise correction processing that is linked with luminance gamma control. The correction intensity calculation processing according to the luminance gamma shown in FIG. 7A is executed by the correction intensity characteristic calculation part 208'_4 shown in FIG. 6 and the color noise correction characteristic control processing according to the luminance shown in FIG. 7B is executed by the color noise correction control section 305 shown in FIG. 6.

As shown in FIG. 7A, the correction intensity characteristic calculation part 208'_4 calculates the correction intensity luminance correction value lw so that it may has a correction intensity characteristic such that as the inputted luminance signal becomes larger than a predetermined luminance threshold $l_{th}$, the correction intensity k becomes larger. By correcting the maximum value $k_{max}$ of the correction intensity using the correction intensity luminance correction value lw, it is possible to realize the correction intensity characteristic such that the correction intensity in a high-luminance part becomes large and the correction intensity in a low-luminance part becomes small. This makes it possible to, when the color noises are conspicuous in the high-luminance part, correct stronger only the color noises in the high-luminance part and to make bad effects by the color noise correction hard to occur in the low-luminance part. As shown in FIG. 7B, the color noise correction control section 305 controls so that as a gamma coefficient of the luminance gamma controlled by the gamma control section 303 becomes large, the luminance threshold $l_{th}$ may also become large. For example, when the gamma coefficient becomes large to the luminance threshold $l_{th1}$ at the time of the gamma coefficient of the luminance gamma being zero, i.e., having a linear input-output characteristic, $l_{th2}$ that is an output luminance to the same input luminance as that of $l_{th1}$ is designated as the luminance threshold. Thereby, even when the camera control enlarges the luminance gamma by the result of the automatic control or the manual control of the user's operation, it becomes possible for the imaging device to attain an effect of the color noise correction with the same correction characteristic in consideration that independent signal processing is performed to the luminance signal and to the chrominance signal, without being affected by the luminance gamma control.

Figure 8:
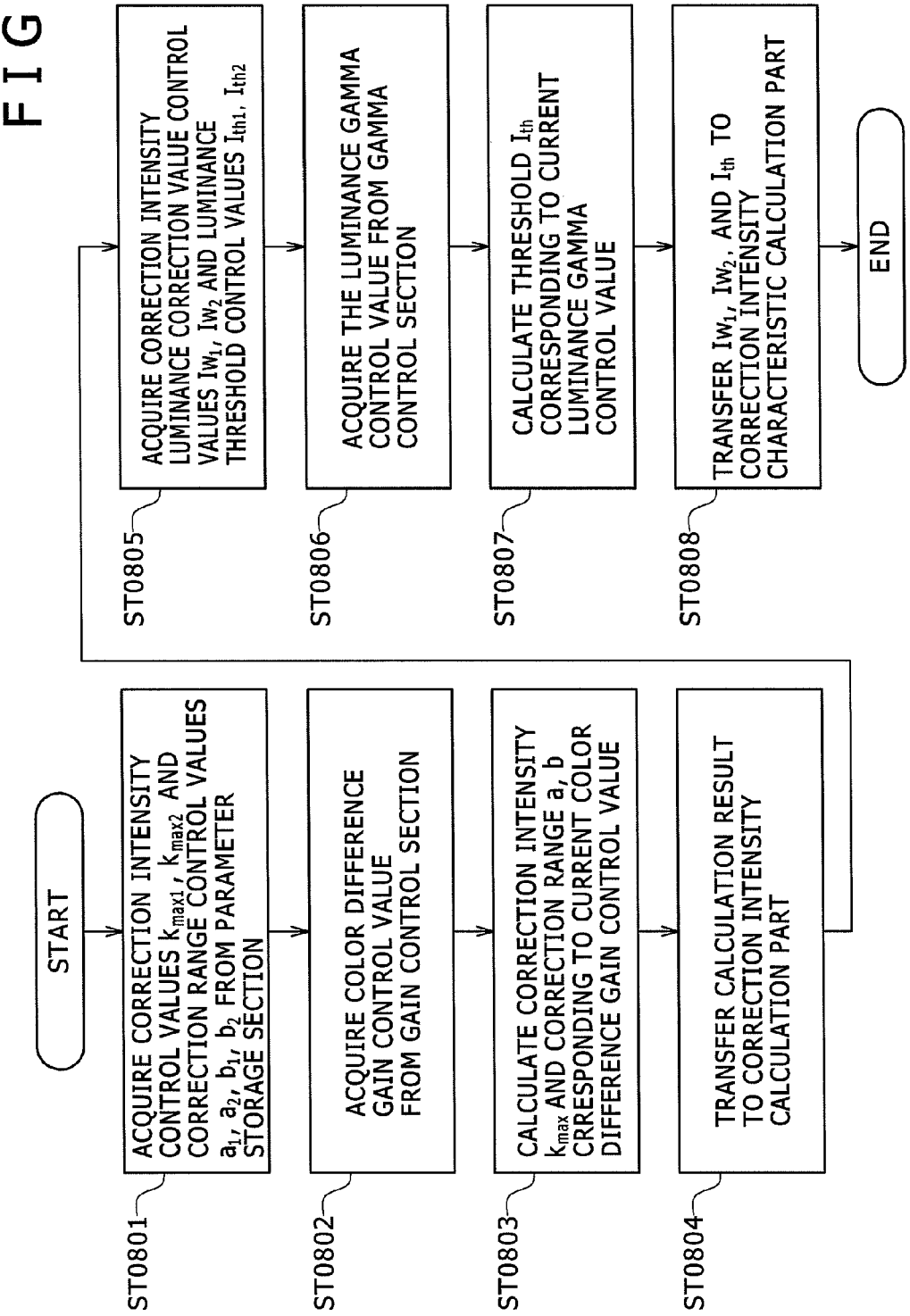
FIG. 8 is a diagram showing one example of a color noise correction control processing sequence of the imaging device according to the second embodiment of the present invention.

FIG. 8 is a diagram showing one example of a color noise correction control processing sequence of the imaging device according to the second embodiment of the present invention. The color noise correction control processing sequence shown in FIG. 8 is executed by the color noise correction control section 305 shown in FIG. 6. In the color noise correction control processing sequence shown in FIG. 8, the correction intensity control values $k_{max1}$, $k_{max2}$ and the correction range control values $a_1$, $a_2$, $b_1$, and $b_2$ are acquired from the parameter storage section 5, respectively, in step ST0801. In step ST0802, the control value of the color difference gain is acquired from the gain control section 304. In step ST0803, the correction intensity $k_{max}$ and the correction ranges a, b are calculated from the characteristic as shown in FIG. 4A using the correction intensity control values $k_{max1}$, $k_{max2}$ and the correction range control values $a_1$, $a_2$, $b_1$, and $b_2$. In step ST0804, the calculation results are transferred to the correction intensity calculation part 208_2. In step ST0805, correction intensity luminance correction value control values $lw_1$, $lw_2$ and luminance threshold control values $l_{th1}$, $l_{th2}$ are acquired from the parameter storage section 5, respectively. In step ST0806, a control value of the luminance gamma is acquired from the gamma control section 303. In step ST0807, the luminance threshold $l_{th}$ corresponding to a current control value of the luminance gamma is calculated from a characteristic as shown in FIG. 7B using the luminance threshold control values $l_{th1}$, $l_{th2}$. In step ST0808, the calculation result and the correction intensity luminance correction value control values $lw_1$, $lw_2$ are transferred to the correction intensity characteristic calculation part 208'_4. This makes it possible for the correction intensity characteristic calculation part 208'_4 to calculate the characteristic of the correction intensity according to the luminance with respect to the control value of the luminance gamma, and makes it possible for the correction intensity calculation part 208'_2 to calculate the optimal correction intensity timely to the control value of the color difference gain based on the calculated characteristic of the correction intensity.

Thus, according to this embodiment, in the case of correcting color noises that are conspicuous in the high-luminance part, by controlling the correction parameters of the color noise correction according to the photographing conditions of the camera, it becomes possible to always correct the color noises in the high-luminance part suitably even when the photographing scene or the subject changes, and thereby to improve the image quality.

Third Embodiment

Figure 9A:
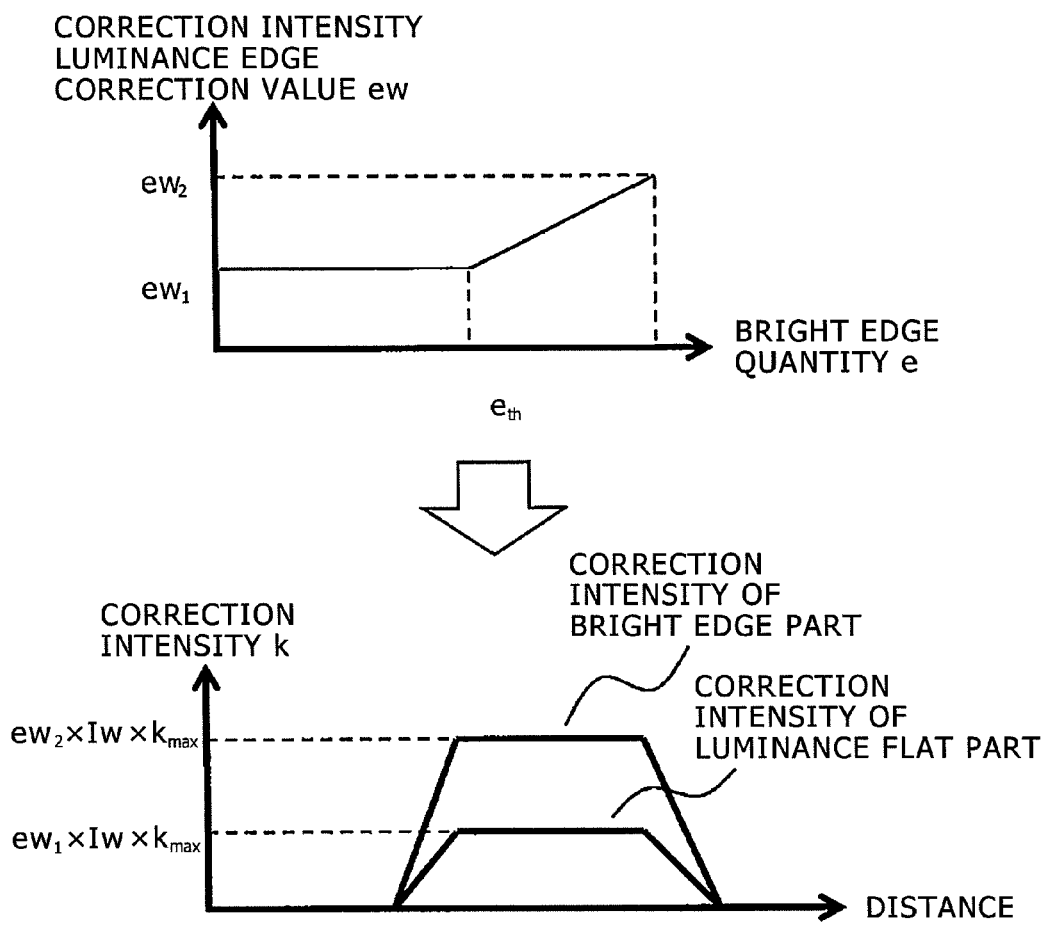
FIG. 9A is a diagram showing calculation processing of a correction intensity according to luminance and a luminance edge of an imaging device according to a third embodiment of the present invention.

FIGS. 9A and 9B are diagrams showing one example of color noise correction control processing of an imaging device according to a third embodiment of the present invention. Its device configuration is the same as that of the imaging device according to the second embodiment, and an explanation of details of each component is omitted accordingly. As one example of the color noise correction control processing that is linked with control of the photographing conditions in the camera control section 3, FIGS. 9A and 9B show an example of a case where the imaging device controls the color noise correction section 208' with the color noise correction section 208' configured so as to vary the characteristic of the correction intensity according to the luminance and a luminance edge, being linked with control of a gamma characteristic of the luminance gamma of the luminance gamma section 202 in the camera signal processing section 2. In FIGS. 9A and 9B, FIG. 9A is a diagram showing calculation processing of the correction intensity according to the luminance and the luminance edge, and FIG. 9B is a diagram showing control of a correction characteristic of the color noise correction processing that is linked with the luminance gamma control. The correction intensity calculation processing according to the luminance shown in FIG. 9A is executed by the correction intensity characteristic calculation part 208'_4 shown in FIG. 6; the color noise correction characteristic control processing according to the luminance gamma shown in FIG. 9B is executed by the color noise correction control section 305 shown in FIG. 6.

As shown in FIG. 9A, the correction intensity characteristic calculation part 208'_4 calculates a correction intensity luminance edge correction value ew so that a correction intensity characteristic such that as a luminance edge quantity of the inputted luminance signal becomes larger than a predetermined luminance edge threshold $e_{th}$, the correction intensity k becomes larger may be realized. The luminance edge quantity can be acquired, for example, by the correction intensity characteristic calculation part 208'_4 performing band-pass filter processing and high-pass filter processing as pretreatments on the inputted luminance signal. By correcting the maximum value $k_{max}$ of the correction intensity using the correction intensity luminance edge correction value ew and the correction intensity luminance correction value lw shown in FIG. 7A, it is possible to realize a correction intensity characteristic such that correction intensities in the high-luminance part and a luminance edge part become large and correction intensities in the low-luminance part and a luminance flat part become small. This makes it possible to correct false color resulting from lens aberration etc. that is easy to occur in a high-luminance edge part as a noise, and to cause the bad effect by the color noise correction not to easily occur in the low-luminance part and the luminance flat part. As shown in FIG. 9B, the color noise correction control section 305 controls so that as the gamma coefficient of the luminance gamma controlled by the gamma control section 303 becomes large, the luminance edge threshold $e_{th}$ may become small. For example, when the gamma coefficient becomes large to a luminance edge threshold control value $e_{th1}$ that is an output luminance difference between predetermined two inputs when the gamma coefficient of the luminance gamma is zero, i.e., having a linear input-output characteristic, $e_{th2}$ that is an output luminance difference between the same inputs is designated as the luminance edge threshold. Thereby, even when the camera control enlarges the luminance gamma by the result of the automatic control or the manual control of the user's operation, it becomes possible to attain the effect of color noise correction with the same correction characteristic in consideration that independent signal processing is performed to the luminance signal and to the chrominance signal, without being affected by the luminance gamma control.

Figure 10:
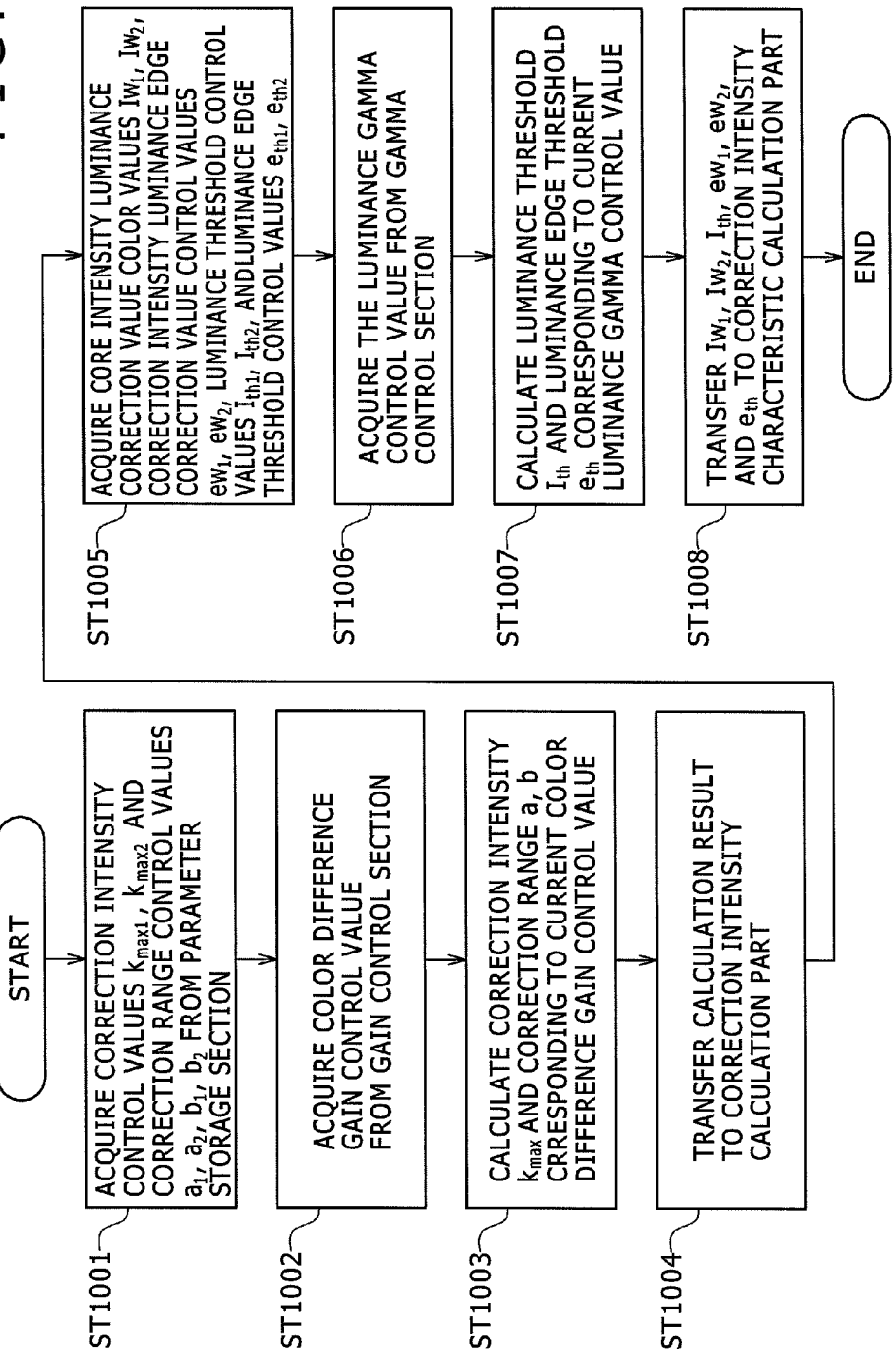
FIG. 10 is a diagram showing one example of a color noise correction control processing sequence of the imaging device according to the third embodiment of the present invention.

FIG. 10 is a diagram showing one example of a color noise correction control processing sequence of the imaging device according to the third embodiment of the present invention. The color noise correction control processing sequence shown in FIG. 10 is executed by the color noise correction control section 305 shown in FIG. 6. In the color noise correction control processing sequence shown in FIG. 10, the correction intensity control values $k_{max1}$, $k_{max2}$ and the correction range control values $a_1$, $a_2$, $b_1$, and $b_2$ are acquired from the parameter storage section 5, respectively, in step ST1001. In step ST1002, the control value of the color difference gain is acquired from the gain control section 304. In step ST1003, the correction intensity control value $k_{max}$ and the correction ranges a, b corresponding to a current color difference gain control value are calculated using the correction intensity control values $k_{max1}$, $k_{max2}$ and the correction range control values $a_1$, $a_2$, $b_1$, and $b_2$ from the characteristic as shown in FIG. 4A. In step ST1004, the calculation result is transferred to the correction intensity calculation part 208'_2. In step ST1005, the correction intensity luminance correction value control values $lw_1$, $lw_2$, correction intensity luminance edge correction value control values $ew_1$, $ew_2$, the luminance threshold control values $l_{th1}$, $l_{th2}$, and luminance edge threshold control values $e_{th1}$, $e_{th2}$ are acquired from the parameter storage section 5, respectively. In step ST1006, the control value of the luminance gamma is acquired from the gamma control section 303. In step ST1007, the luminance threshold $l_{th}$ corresponding to the current control value of the luminance gamma is calculated from the characteristic as shown in FIG. 7B using the luminance threshold control values $l_{th1}$, $l_{th2}$, and the luminance edge threshold $e_{th}$ is calculated from a characteristic as shown in FIG. 9B using the luminance edge threshold control values $e_{th1}$, $e_{th2}$. In step ST1008, the calculation result, the correction intensity luminance correction value control values $lw_1$, $lw_2$, and the correction intensity luminance edge correction value control values $ew_1$, $ew_2$ are transferred to the correction intensity characteristic calculation part 208'_4. This makes it possible for the correction intensity characteristic calculation part 208'_4 to calculate the characteristic of the correction intensity according to the luminance and the luminance edge quantity, and makes it possible for the calculation intensity calculation part 208'_2 to calculate the optimal correction intensity timely to the control value of the color difference gain based on the calculated characteristic of the correction intensity.

Thus, according to this embodiment, in the case of correcting false color occurring in the high-luminance edge part as a noise, by controlling the correction parameters of the color noise correction according to the photographing conditions of the camera, it becomes possible to always correct the false color occurring in the high-luminance edge part suitably, and thereby to improve the image quality.

Fourth Embodiment

Figure 11:
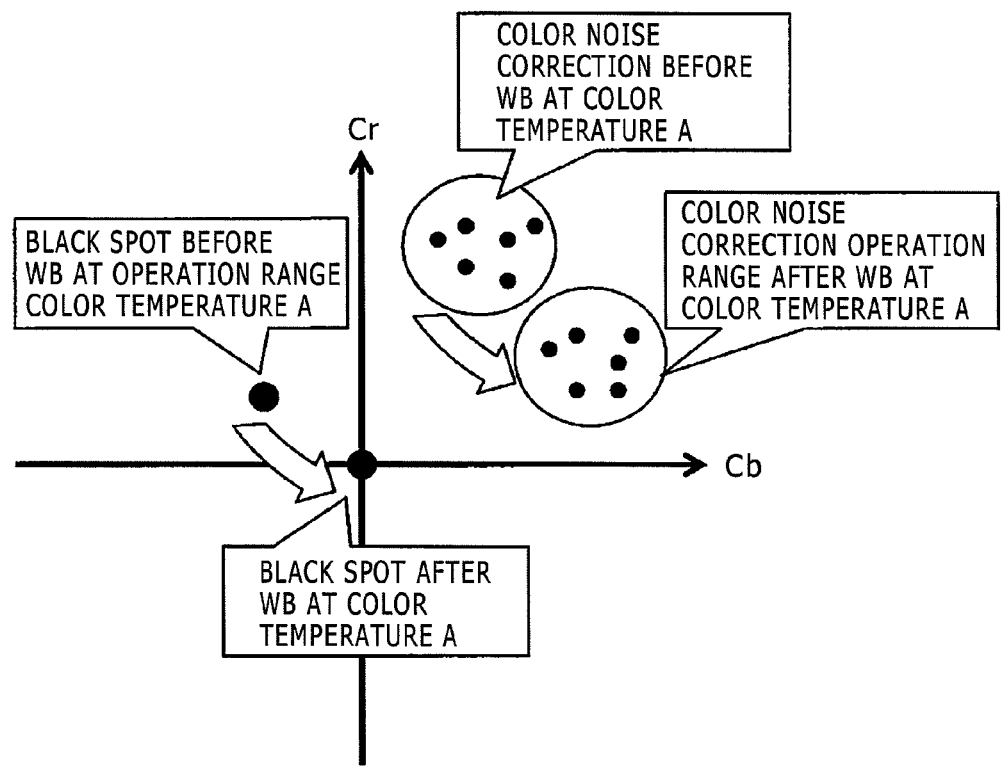
FIG. 11 is a first diagram showing one example of color noise correction control processing of an imaging device according to a fourth embodiment of the present invention.

FIG. 11 is a first diagram showing one example of color noise correction control processing of an imaging device according to a fourth embodiment of the present invention. Its device configuration is the same as that of the imaging device according to the second embodiment, and an explanation of details of each component is omitted accordingly. As one example of the color noise correction control processing that is linked with control of the photographing conditions in the camera control section 3, FIG. 11 shows an example of a case where the imaging device controls the color noise correction section 208' with the color noise correction section 208' configured so as to vary the characteristic of the correction intensity according to the hue and the saturation, being linked with control of the white balance gain of the WB correction section 204 in the camera signal processing section 2. The color noise correction characteristic control processing according to the white balance control shown in FIG. 11 is executed by the color noise correction control section 305 shown in FIG. 6.

As shown in FIG. 11, the correction intensity characteristic calculation part 208'_4 decides an operation range so that the color noise in predetermined ranges of hue and saturation may be designated as a correction target. This makes it possible to correct only color noises that have conspicuous specific color components. Incidentally, although the operation range of the color noise correction is illustrated with a round shape in FIG. 11, it is to simplify an explanation. Actually, the operation range may be specified to be an elliptical shape so that the correction range may become variable for each color component, and may be a rectangular so that processing of determination as to inside and outside of the range on a color difference plane may be performed easily. Moreover, being not limited to the case where the correction target is specified only in the execution range, a correction intensity characteristic whose correction intensity is altered inside and outside the operation range or whose correction intensity varies continuously according to a distance from a center of the operation range may be adopted. As shown in FIG. 11, the color noise correction control section 305 controls the operation range of the color noise correction according to the white balance gain controlled by the WB control section 302. For example, the color noise correction control section 305 controls so that the operation range of the color noise correction may be moved based on how much a black spot at the color temperature A moves by the white balance gain by the WB control. Here, the black spot is a point in the color difference space of the achromatic subject, and when the white balance is operating properly according to the color temperature at the time of photographing, it shall coincide with an origin in the color difference space. This makes the same effect of color noise correction obtainable even when the camera control controls the white balance gain by the result of the automatic control or the manual control of the user's operation, and the color noise characteristic varies because the white balance is changed.

Figure 12:
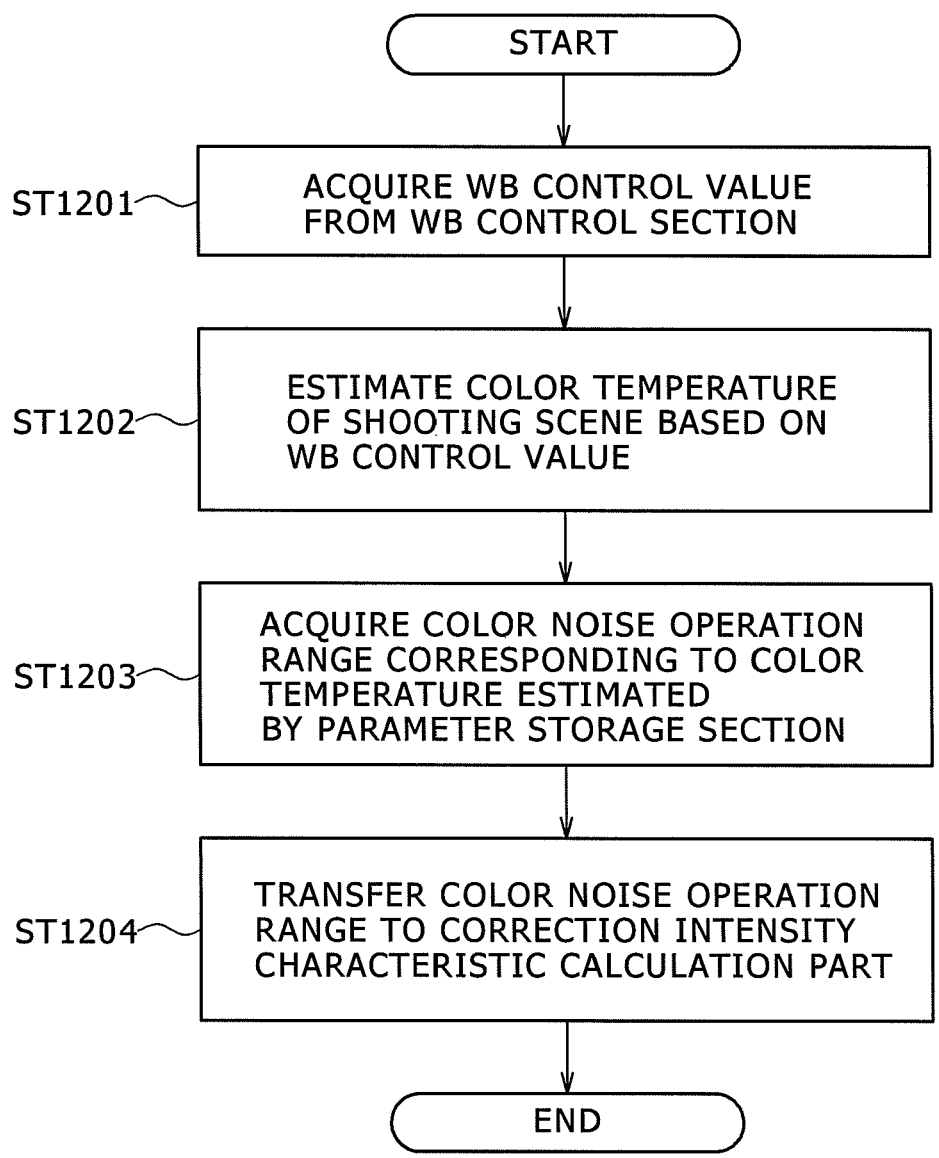
FIG. 12 is a first diagram showing one example of a color noise correction control processing sequence of the imaging device according to the fourth embodiment of the present invention.

FIG. 12 is a first diagram showing one example of a color noise correction control processing sequence of the imaging device according to the fourth embodiment of the present invention. The color noise correction control processing sequence shown in FIG. 12 is executed by the color noise correction control section 305 shown in FIG. 6. In the color noise correction control processing sequence shown in FIG. 12, the white balance control value is acquired from the WB control section 302 in step ST1201. In step ST1202, the color temperature of the photographing scene is estimated based on the white balance control value. What is necessary for this is, for example, to store color temperatures corresponding to representative white balance control values in a form of a table in advance and use a color temperature corresponding to a representative value in the vicinity of an actual control value or its interpolated value. In step ST1203, the color noise operation range corresponding to the color temperature estimated by the parameter storage section 5 is acquired. What is necessary for this is, for example, that the parameter storage section 5 shall store the color noise operation range corresponding to representative color temperatures in advance and the color noise operation range corresponding to a representative value in the vicinity of the estimated color temperature or its interpolated value shall be used. Alternatively, the configuration may have a form where the parameter storage section 5 stores a color noise operation range to a gain quantity for each color component for the white balance in a reference table of multiple dimensions, and the color noise operation range is referred to directly from a control value of the white balance gain instead of the estimated information of the color temperature in step ST1203. In step ST1204, the color noise operation range is transferred to the correction intensity characteristic calculation part 208'_4. This makes it possible for the correction intensity characteristic calculation part 208'_4 to calculate the characteristic of the correction intensity according to the hue and the saturation with respect to the control value of the white balance, and makes it possible for the correction intensity calculation part 208'_2 to calculate the optimal correction intensity timely based on the calculated characteristic of the correction intensity.

Figure 13:
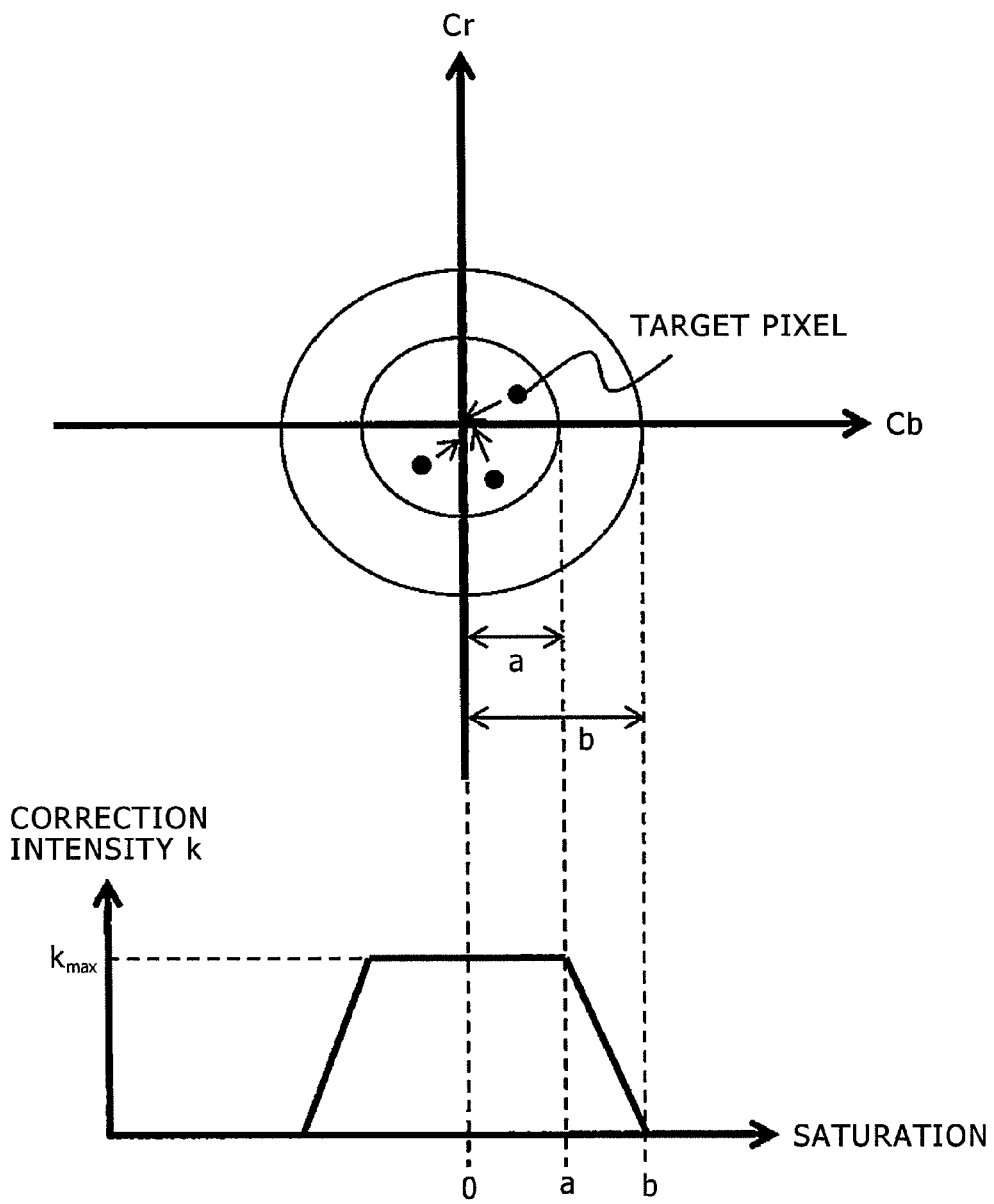
FIG. 13 is a diagram showing one example of the color noise correction intensity determination processing of the imaging device according to the fourth embodiment of the present invention.

FIG. 13 is a diagram showing one example of color noise correction intensity determination processing of the imaging device according to the fourth embodiment of the present invention. The color noise correction intensity determination processing shown in FIG. 13 is an example of processing for calculating the correction intensity when the correction target value calculated by the correction target value calculation part 208'_1 in the color noise correction section 208' shown in FIG. 6 is an origin in the color difference space, namely the achromatic color, and the correction part 208'_3 performs control so that the chrominance signal of the target pixel may be brought close to the correction target value by a ratio depending on a magnitude of the correction intensity decided by the correction intensity calculation part 208'_2 in the color noise correction part section 208', which is executed by the correction intensity calculation part 208'_2.

In FIG. 13, a is a first threshold for color noise estimation, and b is a second threshold for color noise estimation, and the figure shows a relationship between a distance between the chrominance signal of the target pixel in the color difference space, i.e., the saturation and the correction intensity k decided by the color noise correction intensity determination processing according to it. The color noise estimation is performed by comparing the saturation of the chrominance signal of the target pixel, the first threshold a, and the second threshold b. That is, the color noise estimation and the change of the correction intensity are performed as follows: when the saturation of the chrominance signal of the target pixel is smaller than the first threshold a, namely the saturation is very small, it is estimated that the chrominance signal is a color noise component occurring in the chrominance signal of the target pixel of the achromatic subject, the correction intensity is maximized; when the saturation is larger than the second threshold b, it is estimated that there is an influence other than the color noise, namely the target pixel exists inside the subject having a color, the correction intensity is minimized; and when the saturation is larger than the first threshold a and is smaller than the second threshold b, it is estimated that there is a possibility that the both influences coexist, the correction intensity is decided so as to become smaller gradually. By using the correction intensity thus decided, it is possible for the correction part 208'_3 to reduce the color noise component of the chrominance signal in the achromatic subject, and on the other hand, to suppress the color reproduction from falling in the subject having a color. Moreover, the color noise correction control section 305 can control the correction range in which the color noise is estimated and corrected by controlling the first threshold a and the second threshold b in consideration of a characteristic of the noise level of the color noise as correction parameters, and can control the strength of the color noise correction by controlling the maximum vale $k_{max}$ of the color intensity. Therefore, by controlling these correction parameters according to the photographing conditions of the camera control section 3, it is possible to perform the correction even if the characteristic of the color noise varies because the photographing conditions change, and it becomes possible to control the suitable color noise correction that does not depend on the photographing scene and the subject.

Figure 14A:
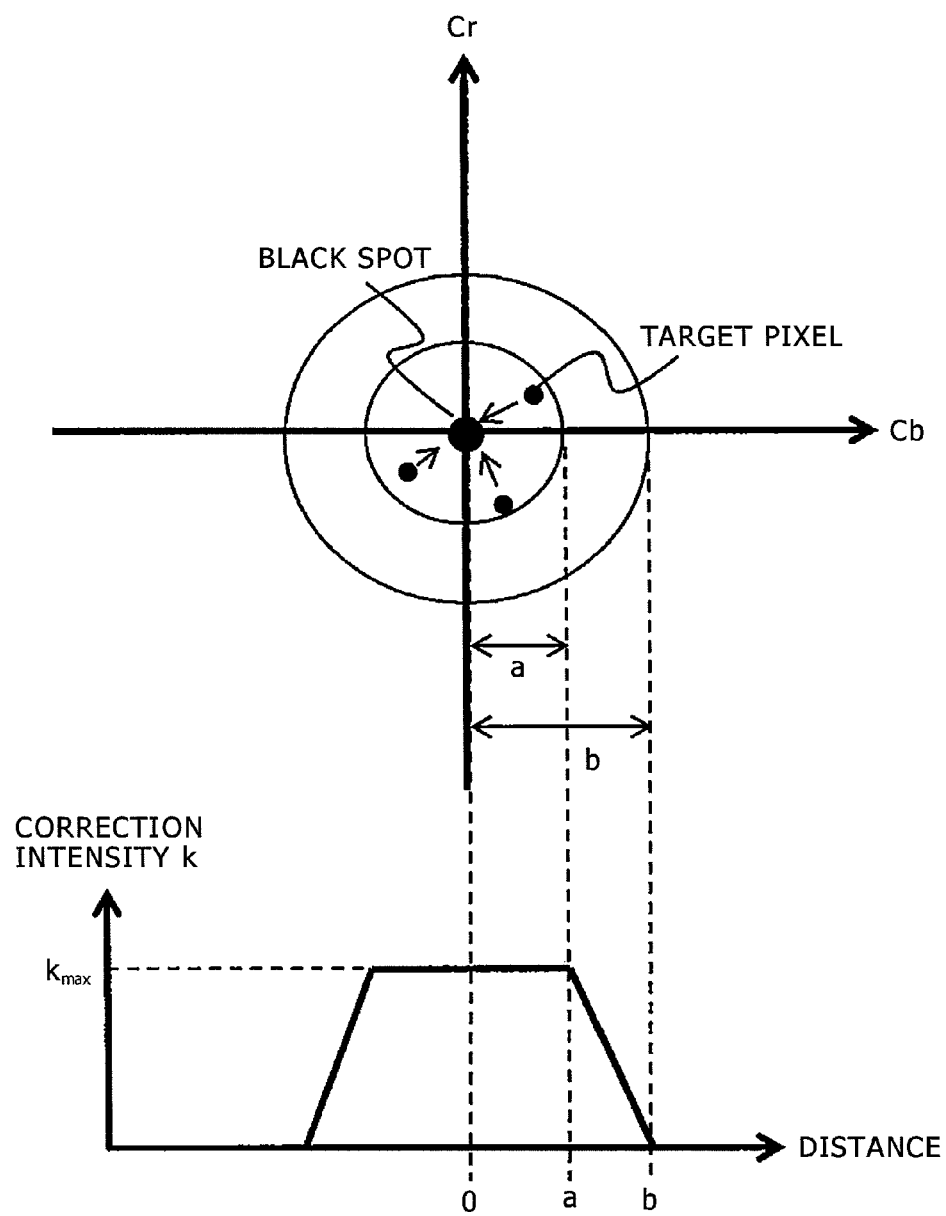
FIG. 14A shows color noise correction control processing when the white balance of the imaging device according to the fourth embodiment of the present invention is operating properly.
Figure 14B:
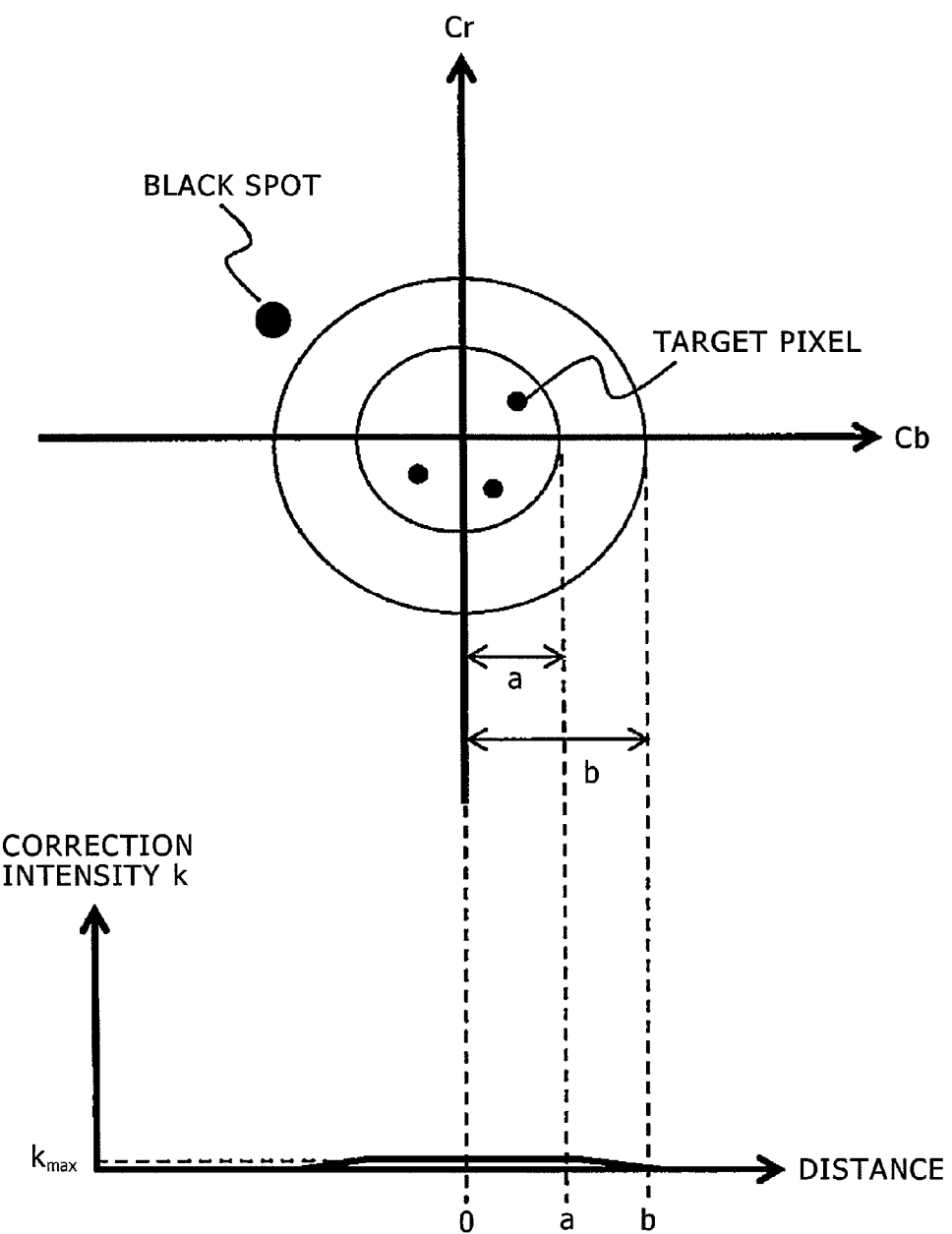
FIG. 14B shows color noise correction control processing when the white balance of the imaging device according to the fourth embodiment of the present invention is not operating properly.

FIGS. 14A and 14B are second diagrams showing one example of the color noise correction control processing of the imaging device according to the fourth embodiment of the present invention. FIGS. 14A and 14B show an example of a case where the imaging device controls the color noise correction section 208' with the color noise correction section 208' configured so as to vary the correction intensity according to the saturation, being linked with control of the photographing conditions of the WB correction section 204 in the camera control section 3. The color noise correction control processing according to the white balance control shown in FIGS. 14A and 14B is executed by the color noise correction control section 305 shown in FIG. 6. In FIGS. 14A and 14B, FIG. 14A shows the color noise correction control processing when the white balance is operating properly, and FIG. 14B shows the color noise correction control processing when the white balance is not operating properly.

As shown in FIG. 14A, when the white balance at the time of photographing is operating properly, the color noise correction control section 305 enlarges the maximum value $k_{max}$ of the correction intensity so that the correction intensity k calculated by the correction intensity calculation part 208'_2 may become large. This makes it possible to correct the color noises on a conspicuous achromatic subject. On the other hand, as shown in FIG. 14B, when the white balance at the time of photographing is not operating properly, the color noise correction control section 305 reduces the maximum value $k_{max}$ of the correction intensity or sets it to zero so that the correction intensity k calculated by the correction intensity calculation part 208'_2 may become small. This can prevent a situation that, when the achromatic subject is attached with a color resulting from a light source because the white balance is not correct and subjects other than the achromatic subject becomes achromatic due to an influence of the light source, only the subjects other than the achromatic subject are reduced in color erroneously to generate an unnatural picture.

FIG. 15 is a second diagram showing one example of a color noise correction control processing sequence of the imaging device according to the fourth embodiment of the present invention. The color noise correction control processing sequence shown in FIG. 15 is executed by the color noise correction control section 305 shown in FIG. 6.

In the color noise correction control processing sequence shown in FIG. 15, correction intensity control values $k_{max1}$, $k_{max2}$ and the correction range control values $a_1$, $a_2$, $b_1$, and $b_2$ are acquired from the parameter storage section 5 in step ST1501. In step ST1502, a degree of propriety of white balance is acquired from the WB control section. In the WB control section 302, the degree of propriety of white balance can be acquired as a ratio of the number of pixels whose saturations are less than or equal to a threshold, an average of the color difference signals after the correction, the control value of the white balance gain, or the like. In step ST1503, it is determined whether the white balance is operating properly by comparing the degree of propriety of white balance with a predetermined threshold. For example, both when the average of the color difference signals after the correction is larger than a threshold and when the control value of the white balance gain is limited by a maximum value or a minimum value in a range where the control value of the white balance gain is controllable, it is determined that the white balance is not satisfactorily established, having not been corrected sufficiently. As a result of the determination processing, when it is decided that the white balance is operating properly, the process proceeds to step ST1504; when it is decided that it is not operating properly, the process proceeds to step ST1506. In step ST1504, the control value of the color difference gain is acquired from the gain control section 304. In step ST1505, the correction intensity $k_{max}$ and the correction ranges a, b corresponding to the current control value of the color difference gain are calculated from the characteristics shown in FIG. 4A using the correction intensity control values $k_{max1}$, $k_{max2}$ and the correction range control values $a_1$, $a_2$, $b_1$, and $b_2$. In step ST1506, zero is set to the correction intensity $k_{max}$. In step ST1507, the calculation result is transferred to the correction intensity calculation part 208'_2. This makes it possible that, when the white balance is operating properly, the correction intensity calculation part 208'_2 calculates the optimal correction intensity to the control value of the color difference gain and that, when the white balance is not operating properly, the correction is turned off to prevent erroneous correction.

Thus, according to this embodiment, by controlling the correction parameters of color noise correction according to the white balance control of the camera, it becomes possible to always perform the suitable color noise correction even when the color temperature of the photographing scene changes, and thereby to improve the image quality.

Fifth Embodiment

Figure 16:
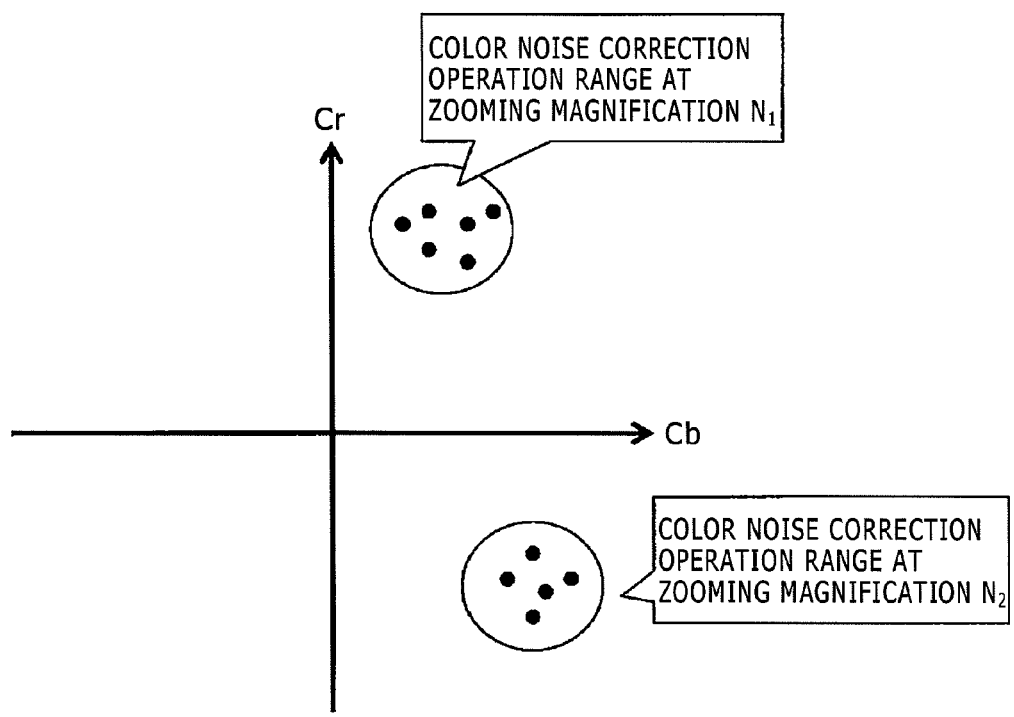
FIG. 16 is a diagram showing one example of color noise correction control processing of an imaging device according to a fifth embodiment of the present invention.

FIG. 16 is a diagram showing one example of color noise correction control processing of an imaging device according to a fifth embodiment of the present invention. Its device configuration is the same as that of the imaging device according to the second embodiment, and an explanation of details of each component is omitted accordingly. As one example of the color noise correction control processing that is linked with control of the photographing conditions in the camera control section 3, FIG. 16 shows an example of a case where the imaging device controls the color noise correction section 208' with the color noise correction section 208' configured so as to vary the characteristic of the correction intensity according to the hue and the saturation, being linked with control of the zoom magnification of the lens 101 in the imaging section 1. The color noise correction characteristic control processing according to the zoom control shown in FIG. 16 is executed by the color noise correction control section 305 shown in FIG. 6.

As shown in FIG. 16, the correction intensity characteristic calculation part 208'_4 decides the operation range so that the color noise in predetermined ranges of hue and saturation may be designated as the correction target. Thereby, only the color noise that has conspicuous specific color components can be corrected. The color noise correction control section 305 controls the operation range of the color noise correction according to the zoom magnification of the lens 101 controlled by the imaging control section 301. For example, if the imaging control section 301 controls the lens so that the zoom magnification may become N2 times in the operation range of the color noise correction at the time of the zoom magnification being N1 times, the color noise correction control section 305 will acquire the operation range of the color noise correction corresponding to the case where the zoom magnification is N2 times from the parameter storage section 5 and will switch the operation range to a new one. Thereby, even if the characteristic of the color noise varies according to the zoom magnification, the same effect of the color noise correction will be acquirable. For example, in the case of correcting false color resulting from lens aberration etc. as a noise, since the lens aberration varies with the zoom magnification, a characteristic of the false color also varies with the zoom magnification; however, even in such a case, the correction effect of the false color can be obtained regardless of the zoom magnification. Incidentally, the color noise correction control section 305 may control the operation range of the color noise correction according to not only the zoom magnification of the lens 101 controlled by the imaging control section 301 but also several optical conditions such as the focus position of the lens 101 and the amount of diaphragm of the iris 102, and naturally may control other correction parameters such as the correction intensity.

Figure 17:
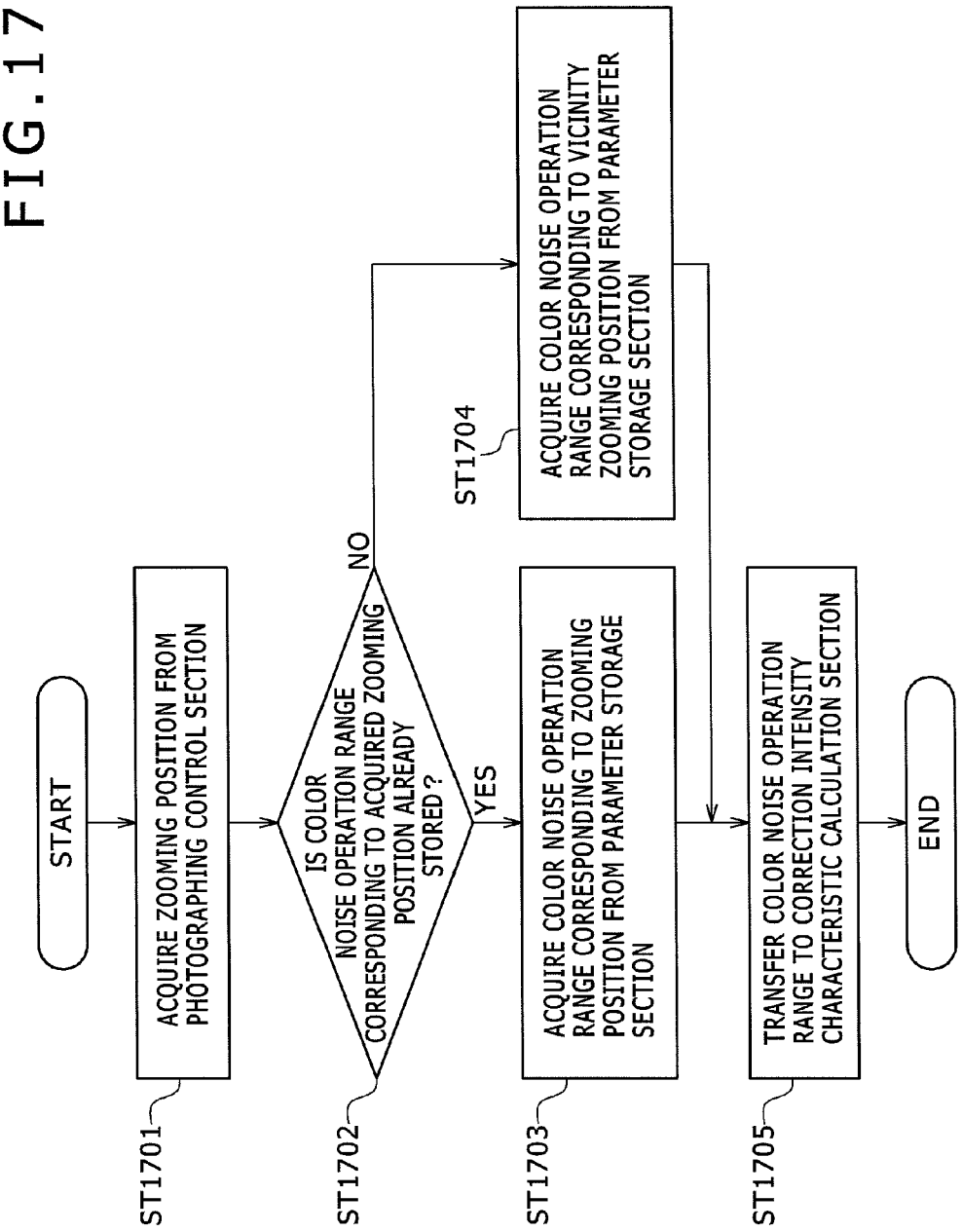
FIG. 17 is a diagram showing one example of a color noise correction control processing sequence of the imaging device according to the fifth embodiment of the present invention.

FIG. 17 is a diagram showing one example of a color noise correction control processing sequence of the imaging device according to the fifth embodiment of the present invention. The color noise correction control processing sequence shown in FIG. 17 is executed by the color noise correction control section 305 shown in FIG. 6.

In the color noise correction control processing sequence shown in FIG. 17, the control information of a position of the zoom lens is acquired from the imaging control section 301 in step ST1701. In step ST1702, it is determined whether the color noise operation range corresponding to the acquired position of the zoom lens has been stored in the parameter storage section 5. If it has been stored, the process will proceed to step ST1703, and if there is no corresponding color noise operation range, the process will proceed to step ST1704. In step ST1703, the color noise operation range corresponding to the position of the zoom lens is acquired from the parameter storage section 5. In step ST1704, the color noise operation ranges at multiple vicinity positions of the zoom lens in each of which the color noise operation range exists are acquired from the parameter storage section 5, and a color noise operation range at a current position of the zoom lens is calculated by the interpolation operation. In step ST1705, the color noise operation range is transferred to the correction intensity characteristic calculation part 208'_4. This makes it possible for the correction intensity characteristic calculation part 208'_4 to calculate the optimal correction intensity timely to the control value of the zoom magnification.

Thus, according to this embodiment, by controlling the correction parameters of the color noise correction according to control of the optical conditions of the camera, it becomes possible to always perform the suitable color noise correction even when the optical conditions of the camera change, and thereby to improve the image quality.

Sixth Embodiment

Figure 18:
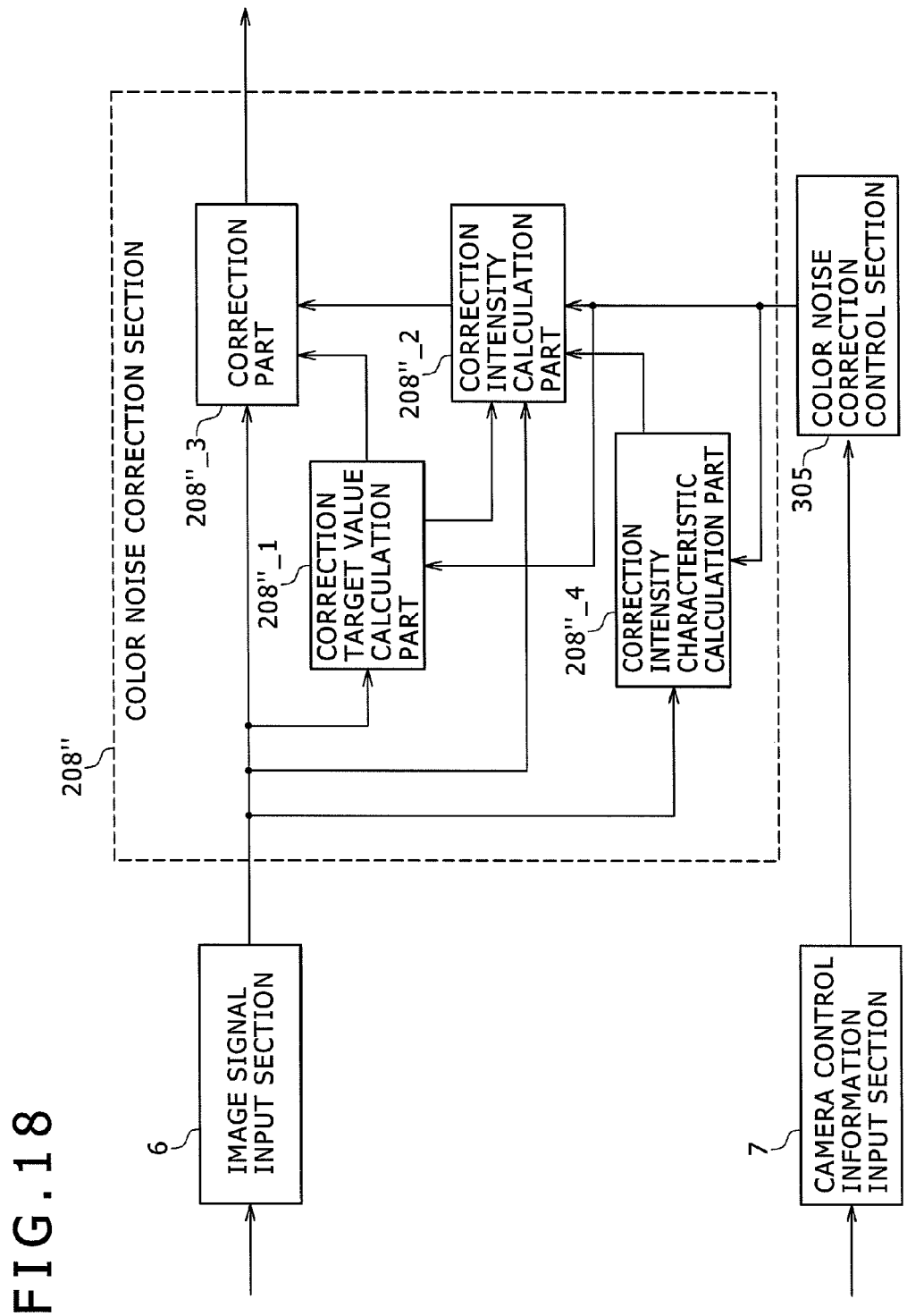
FIG. 18 is a schematic diagram showing an image signal processor according to a sixth embodiment of the present invention.

FIG. 18 is a schematic diagram showing an image signal processor according to a sixth embodiment of the present invention. In FIG. 18, 6 is an image signal input section, 7 is a color noise correction section", 208" is a color noise correction section, and 305 is a color noise correction control section, and the image signal processor is configured such that an image signal is inputted from the image signal input section 6 instead of the luminance gain section 203 and the color difference gain section 207 to the color noise correction section 208, and respective pieces of camera control information are inputted from a camera control information input section 7 instead of the imaging control section 301, the WB control section 302, the gamma control section 303, and the gain control section 304 to the color noise correction control section 305.

In the image signal processor shown in FIG. 18, the image signal input section 6 inputs an image signal from another imaging device, recording medium, etc. The image signal may be converted into an image signal in a form convenient in performing the color noise correction processing by the image signal input section 6 performing elongation processing and format conversion processing when necessary on a compressed picture.

The camera control information input section 7 inputs the camera control information at a time when the image signal inputted from the image signal input section 6 was photographed. For example, when the image signal input section 6 inputs the image signal from another imaging device, what is necessary is to acquire the camera control information of the other imaging device through a network; when the image signal is inputted from a recording medium, provided that the camera control information at the time of photographing is embedded as metadata in a previously recorded image signal, what is necessary is to read and input the metadata. Alternatively, a configuration that has a user input section and enables the camera control information to be inputted manually by the user's operation can be adopted. The color noise correction control section 305 controls respective correction parameters of a correction target value calculation part 208"_1, a correction intensity calculation part 208"_2, and a correction intensity characteristic calculation part 208"_3 in the color noise correction section 208" based on the camera control information inputted from the camera control information input section 7, and the color noise correction section 208" performs the color noise correction processing on the image signal inputted from the image signal input section 6 based on the correction parameters controlled by the color noise correction control section 305, and thereby it becomes possible to always perform the color noise correction suitably even on the image signal inputted from another imaging device and recording media without depending on the photographing scene and the subject, and to improve the image quality.

Thus, according to this embodiment, also in the image signal processor, by controlling the correction parameters of the color noise correction according to the photographing conditions of the camera, it becomes possible to always perform the suitable color noise correction even when the photographing scene or the subject changes, and thereby to improve the image quality.

As described above, according to each device according to each embodiment, it becomes possible to provide the imaging device and the image signal processor that realize enhancement of the image quality by performing the suitable color noise correction without depending on the subject, the photographing scene, and the photographing conditions.

Incidentally, the present invention is not limited to the above-mentioned embodiments, and includes various modifications. For example, the above-mentioned embodiments were explained in detail in order to explain the present invention plainly, not being necessarily limited to an embodiment that has all the explained configurations. Moreover, a part of the configuration of a certain embodiment can be replaced with configurations of other embodiments, and a configuration of another embodiment can be also added to the configuration of a certain embodiment. Moreover, a part of the configuration of each embodiment can be subjected to addition, deletion, and substitution of another configuration.

Moreover, a part or the whole of the above-mentioned each configuration may be configured with hardware, or may be configured to be realized by a program being executed by a processor. Moreover, control lines and information lines that are considered to be necessary on explanation are shown, and all control lines or information lines are not necessarily shown as a final product. Actually, it may be considered that almost all the configurations are coupled mutually.

What is claimed is:

1. An imaging device, comprising:
   an imaging unit;
   a signal processing unit that generates a luminance signal and a chrominance signal by performing signal processing on an image signal inputted from the imaging unit;
   a control unit that controls at least one photographing condition among optical conditions and exposure of the imaging unit and an input-output characteristic of signal processing of the signal processing unit, wherein the signal processing unit comprises a color noise correction unit that extracts and corrects a color noise component from the generated chrominance signal, wherein the control unit that controls correction parameters of correction by the color noise correction unit according to information of the photographing conditions, wherein the information of the photographing conditions is the input-output characteristic of the signal processing of the signal processing unit, wherein the color noise correction unit extracts and corrects the color noise component from the chrominance signal inputted from the signal processing unit according to the correction characteristic based on hue or saturation of the chrominance signal inputted from the signal processing unit, wherein the control unit controls the correction characteristic based on the hue or the saturation of the chrominance signal using the input-output characteristic of the signal processing to the color component in the signal processing unit that was acquired from the signal processing unit, wherein the control unit estimates a color temperature at the time of photographing based on the luminance signal and the chrominance signal inputted from the signal processing unit, and performs white balance control of controlling the input-output characteristic of the signal processing to the color component of the signal processing unit by the estimated color temperature, wherein the control unit includes the estimated color temperature or the input-output characteristic of the signal processing to the color component as information of the photographing conditions, wherein the control unit evaluates a degree of propriety of white balance based on the luminance signal and the chrominance signal that the signal processing unit outputs, wherein the control unit includes the degree of propriety of white balance as information of the photographing conditions, and wherein the control unit controls so that, when the degree of propriety of white balance is lower than a predetermined threshold, color noise correction of the color noise correction unit may be weakened.

* * * * *